United States Patent
Ide et al.

(10) Patent No.: US 8,432,419 B2
(45) Date of Patent: Apr. 30, 2013

(54) DRIVING APPARATUS FOR LIQUID CRYSTAL LIGHT MODULATOR AND VARIABLE OPTICAL ATTENUATOR EMPLOYING DRIVING APPARATUS

(75) Inventors: Masafumi Ide, Tokorozawa (JP); Atsushi Shiraishi, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 358 days.

(21) Appl. No.: 12/761,809

(22) Filed: Apr. 16, 2010

(65) Prior Publication Data
US 2010/0265282 A1 Oct. 21, 2010

(30) Foreign Application Priority Data
Apr. 17, 2009 (JP) ................... 2009-101324

(51) Int. Cl.
*G09G 5/10* (2006.01)

(52) U.S. Cl.
USPC ............................................ 345/691; 345/94

(58) Field of Classification Search ............. 345/84, 345/87, 89, 94, 99, 690–691
See application file for complete search history.

(56) References Cited

U.S. PATENT DOCUMENTS

| | | | | |
|---|---|---|---|---|
| 2003/0052904 A1* | 3/2003 | Gu | ................. | 345/691 |
| 2005/0110732 A1* | 5/2005 | Kim | ................. | 345/87 |
| 2006/0221039 A1* | 10/2006 | Ishiguchi | ......... | 345/98 |
| 2009/0303161 A1* | 12/2009 | Messmer et al. | ...... | 345/55 |

FOREIGN PATENT DOCUMENTS

| | | |
|---|---|---|
| JP | 62-017735 A | 1/1987 |
| JP | 04-299388 A | 10/1992 |
| JP | 06-332407 A | 12/1994 |
| JP | 2001-142050 A | 5/2001 |
| JP | 2002-162944 A | 6/2002 |
| JP | 2008-004339 A | 1/2008 |

* cited by examiner

*Primary Examiner* — Chanh Nguyen
*Assistant Examiner* — Jonathan Blancha
(74) *Attorney, Agent, or Firm* — Sughrue Mion, PLLC

(57) ABSTRACT

A liquid crystal light modulator 11 modulates a light according to an effective value of a supplied drive signal. A driving apparatus 21 changes the effective value of each frame of the drive signal supplied to the liquid crystal light modulator 11 according to modulation data. The driving apparatus 21 generates the drive signal containing plural pulses in each frame. The driving apparatus 21 supplies the generated drive signal to the liquid crystal light modulator 11, thereby enabling a high-frequency drive of the liquid crystal light modulator 11.

8 Claims, 17 Drawing Sheets

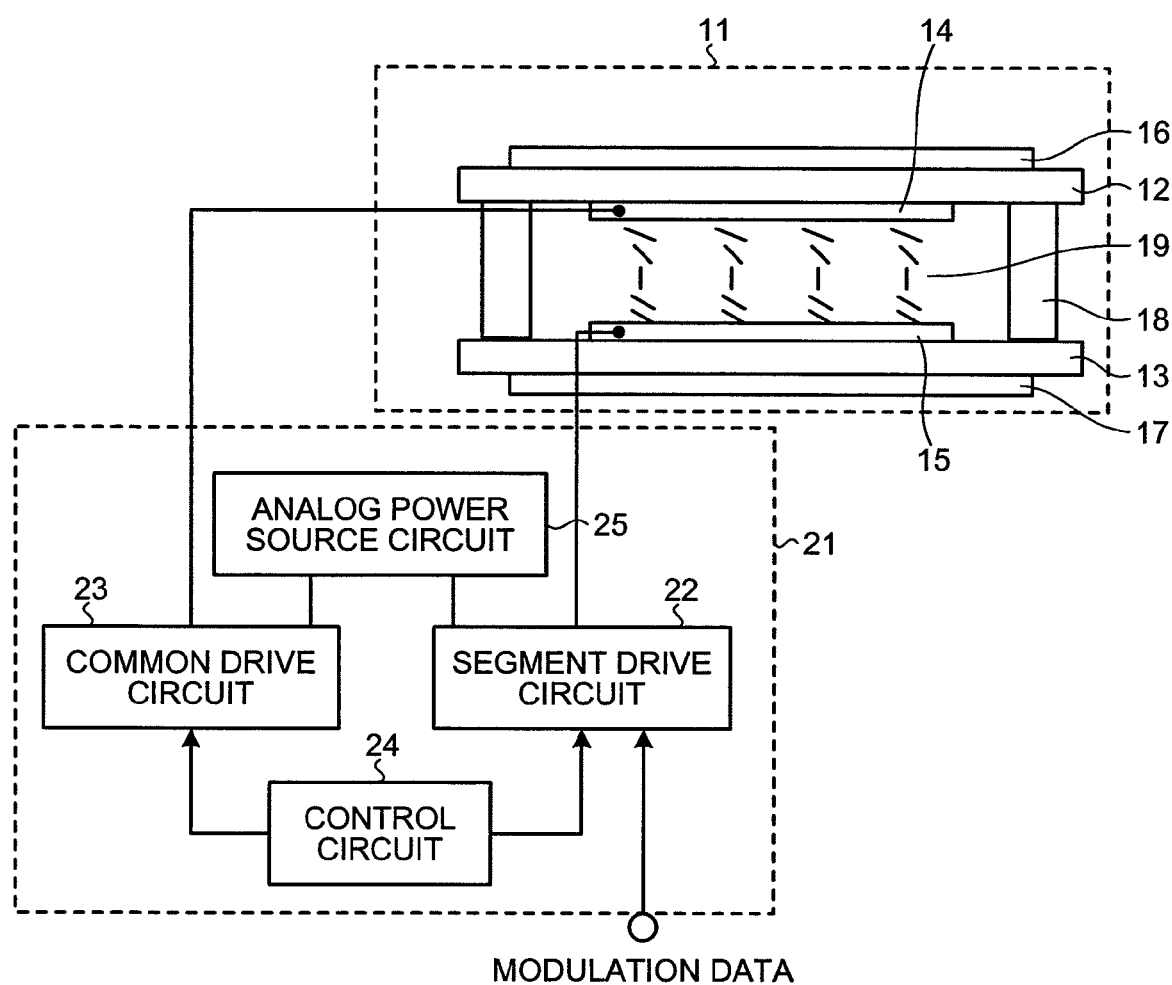

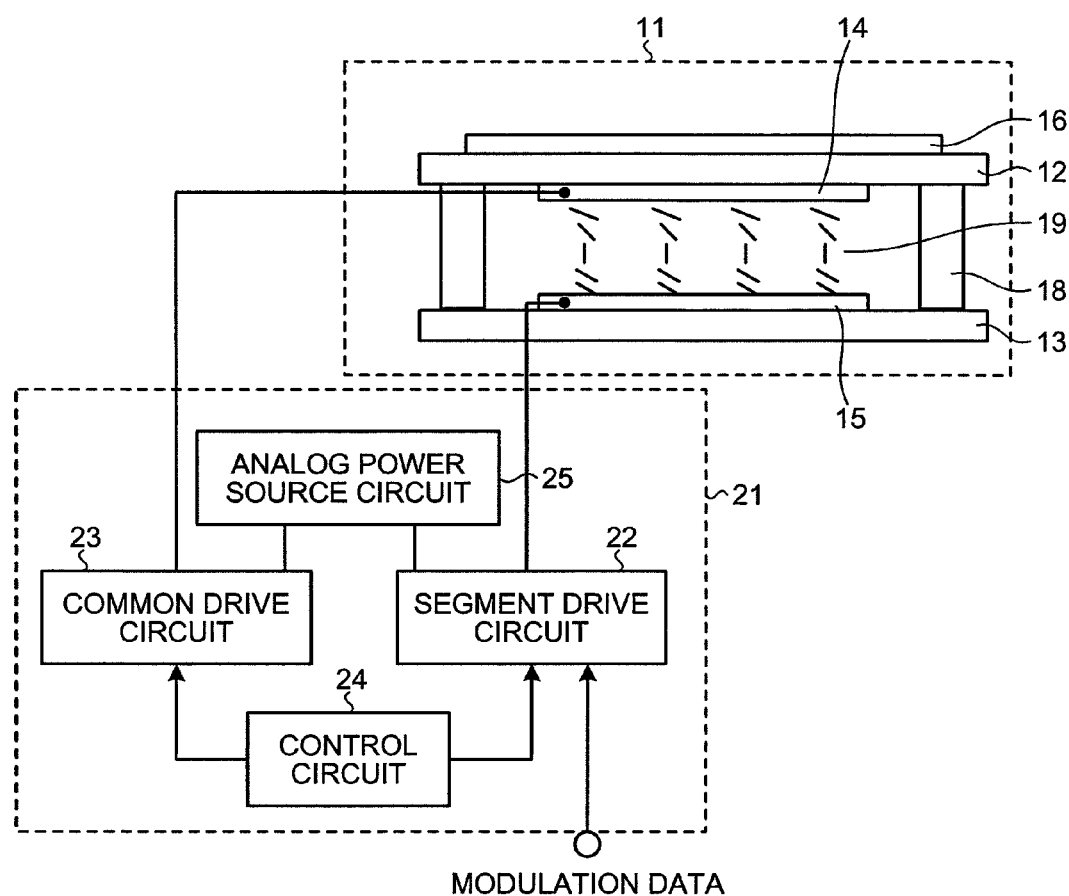

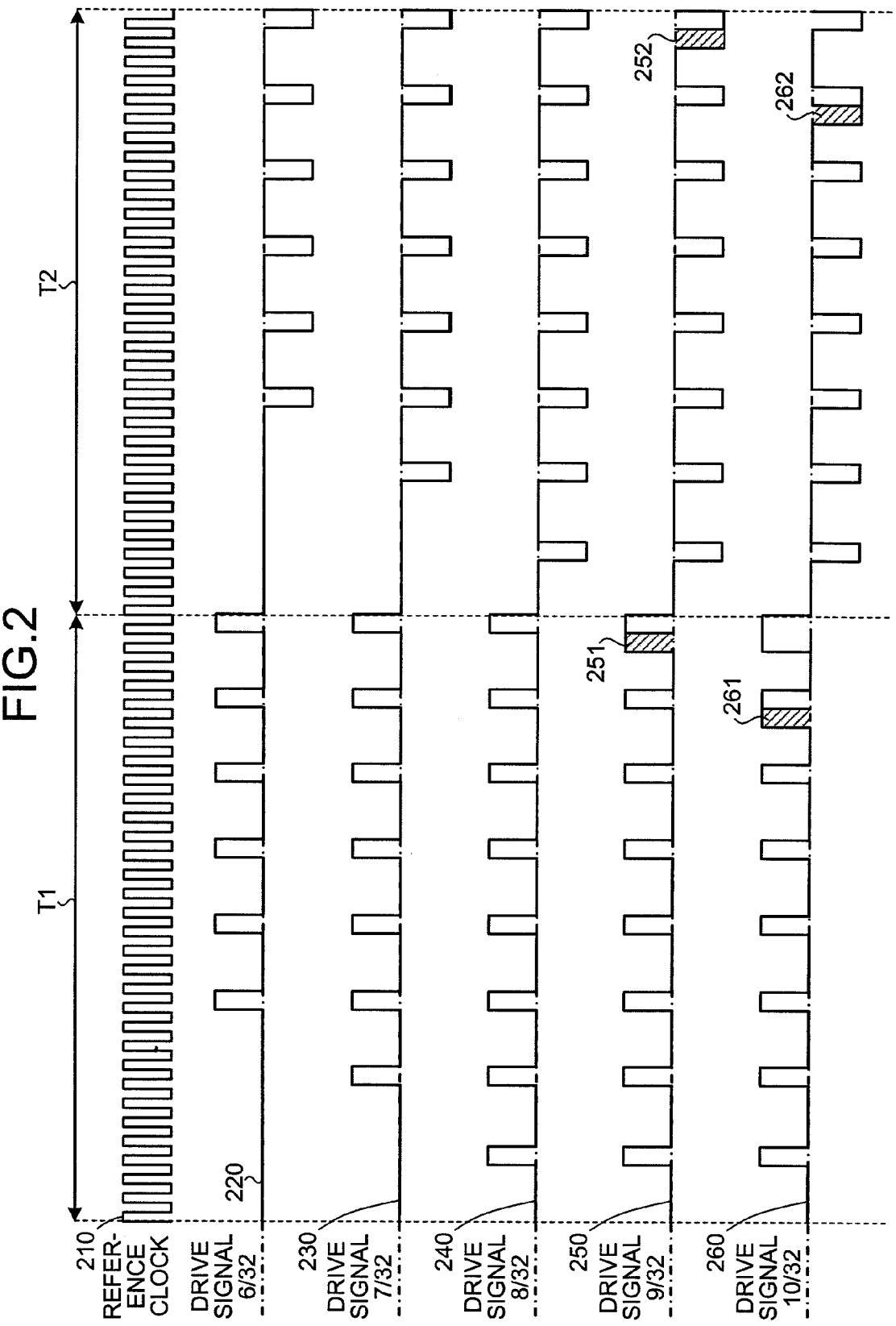

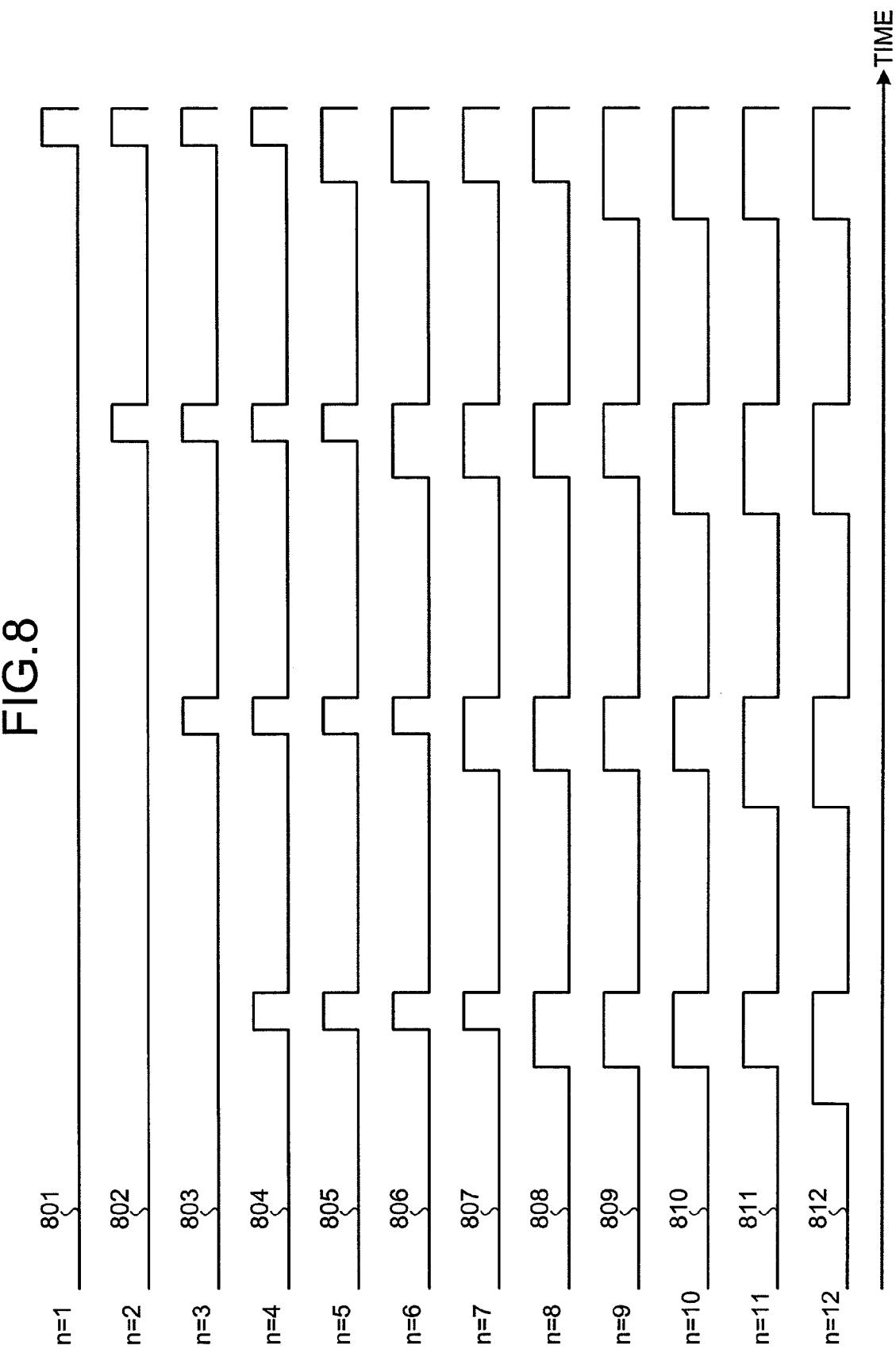

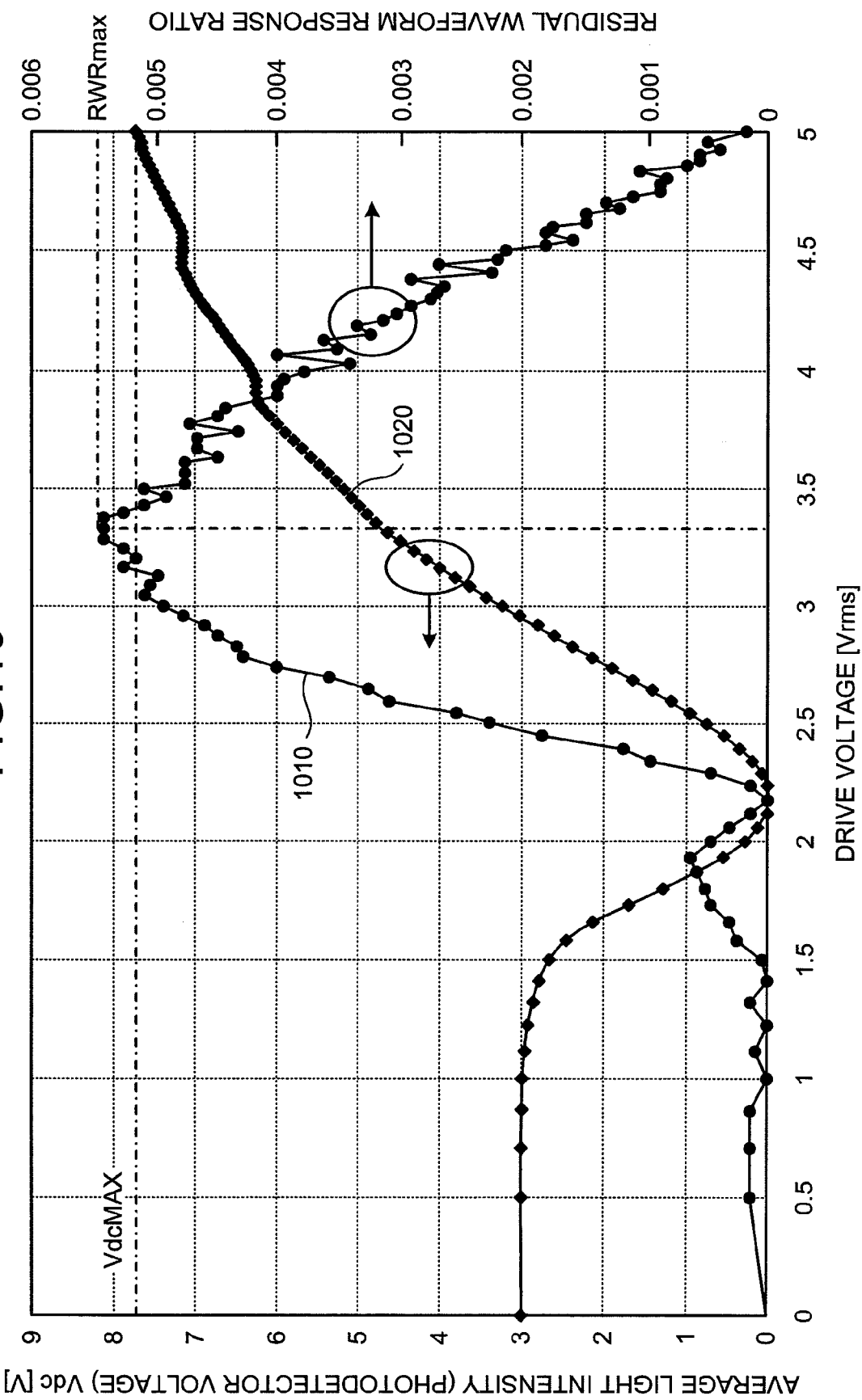

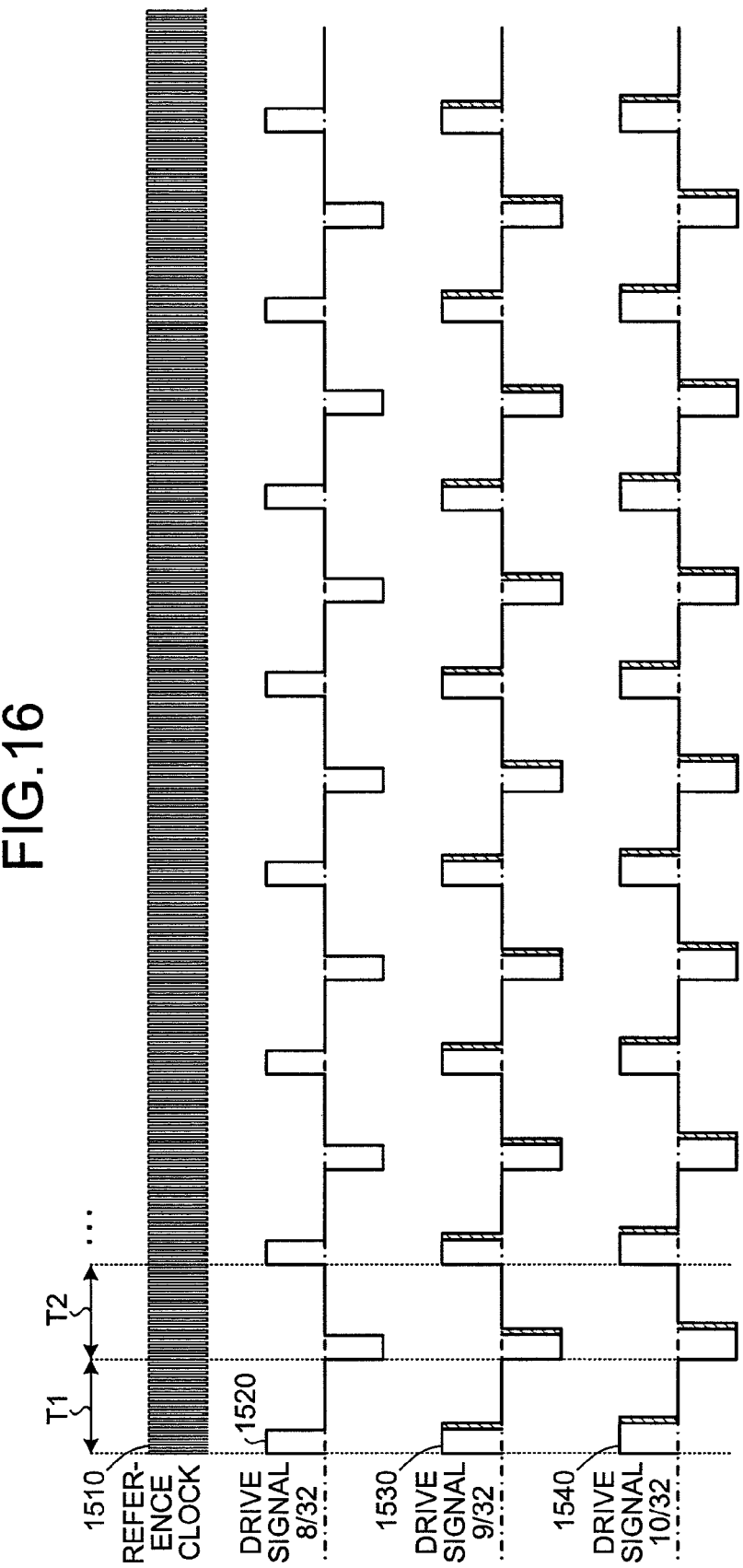

DRIVING APPARATUS FOR LIQUID CRYSTAL LIGHT MODULATOR AND VARIABLE OPTICAL ATTENUATOR EMPLOYING DRIVING APPARATUS

BACKGROUND OF THE INVENTION

1. Field of the Invention

The present invention relates to a driving apparatus that drives a liquid crystal light modulator and a light modulating apparatus.

2. Description of the Related Art

A liquid crystal light modulator employing a liquid crystal has been conventionally used. The liquid crystal light modulator is an element that can be used, for example, as variable optical attenuator (VOA). The pulse width modulation (PWM), for example, is known as a modulation system for a drive signal supplied to the liquid crystal light modulator.

The pulse width modulation has an advantage in easy digital control, and in circuit scale and power consumption as compared with a modulation system such as the pulse height modulation (PHM). By supplying a drive signal that controls the pulse width by the pulse width modulation to the liquid crystal light modulator, the light attenuation rate of the liquid crystal light modulator can be adjusted and the light can be modulated. The drive signal and a reference clock for generating the drive signal in the conventional technology are described below.

FIG. 15 is a diagram of an example of a drive signal supplied to the liquid crystal light modulator by a conventional driving apparatus. In FIG. 15, a drive signal in which the pulse width is changed by 32 levels is described. A frame T1 indicates a period during which an effective voltage based on modulation data is applied to the pixel portion of the liquid crystal light modulator. A reference clock 1510 is a reference clock for generating the drive signal. The frame T1 is a period for 32 cycles of the clock signal 1510. The frame T1 is followed by a frame T2. Frames T1 and T2 are set to have the same length.

Drive signals 1520, 1530, and 1540 are the drive signals generated so as to have the pulse width of 8/32 level, 9/32 level, and 10/32 level, respectively. In the pulse width modulation, an arbitrary voltage (effective value) can be achieved by changing, in the frame T1, the ratio (pulse width) between the period during which the voltage is applied and the period during which the voltage is not applied. In the pulse width modulation, the frames are repeated and the polarity, for example, is changed for each frame.

For an accurate and reliable pulse width modulation, a pulse width modulation circuit is usually configured by a digital circuit. The drive signals 1520, 1530, and 1540 are generated by counting the reference clock 1510 according to the modulation data. As indicated by the hatched portions of the drive signals 1520, 1530, and 1540, when the modulation data changes by one, the pulse width changes by one clock width of the reference clock 1510. Accordingly, the frequency of the reference clock requires the drive frequency multiplied by the number of levels or more.

FIG. 16 is a diagram of another example of the drive signal supplied to the liquid crystal light modulator by the conventional driving apparatus. The drive signals shown in FIG. 16 represent the drive signals shown in FIG. 15 with their frequencies octupled. An increase in the pulse width due to a change in the modulation data is reflected on each pulse. The effective voltage applied is the same as that of the drive signal shown in FIG. 15.

[Patent Document 1] Japanese Patent Application Laid-Open Publication No. 2002-162944

In the conventional pulse width modulation, however, when the liquid crystal light modulator employs a liquid crystal element responding at a high speed, a waveform response (flicker) is caused by the liquid crystal element that responds to the pulse of the drive signal, thereby deteriorating the quality of the output light of the liquid crystal light modulator. To solve this, the frame frequency of the drive signal is increased so that the liquid crystal element does not respond to the pulse of the drive signal. However, for a multi-level control, the minimum pulse width of the drive signal must be short. When the minimum pulse width of the drive signal is short, the frequency of the reference clock for generating the drive signal must be high, resulting in an increased power consumption, an increased circuit cost, and a generation of high frequency noise, etc.

To solve the problems of the conventional technology described above, the present invention aims to provide a driving apparatus and a light modulating apparatus that can enhance the quality of the output light of the liquid crystal light modulator.

SUMMARY OF THE INVENTION

To solve the above problems and achieve the aims, the driving apparatus according to the present invention supplies a drive signal to a pixel portion of a liquid crystal light modulator. The drive signal includes a plurality of frames each of which is a period during which an effective voltage based on modulation data is applied to the pixel portion of the liquid crystal light modulator. The driving apparatus includes: a generating unit that generates, for each frame, the drive signal containing a plurality of pulses by increasing the number of pulses contained in each frame in accordance with an increase of the modulation data when the number is less than a predetermined number, while increasing the width of a pulse contained in each frame in accordance with the increase of the modulation data when the number has reached the predetermined number; and a supplying unit that supplies the drive signal generated by the generating unit to the liquid crystal light modulator.

The configuration described above enables a high-frequency drive of the liquid crystal light modulator without increasing the frequency of the reference clock. Further, the configuration makes it possible to change an effective value of each frame of the drive signal according to modulation data, without increasing the frequency of the reference clock.

In the driving apparatus according to the present invention, the drive signal is generated such that an alternation of polarity is completed within two consecutive frames.

In the driving apparatus according to the present invention, the frame corresponds to a section that includes a plurality of pulses, the number of which corresponds to the number of levels of the modulation data, of a reference clock for generating the drive signal.

In the driving apparatus according to the present invention, the longest period during which no pulse is applied within the frame except when an applied voltage is 0 V is set at $1 \times 10^{-4}$ sec or less.

In the driving apparatus according to the present invention, the longest period during which no pulse is applied within the frame except when an applied voltage is 0 V is set at $5 \times 10^{-5}$ sec or less.

In the driving apparatus according to the present invention, the lowest frequency contained in the drive signal defined by inverse number of a frame polarity alternating cycle when the number of pulses contained in each frame has reached the predetermined number is set at 100 Hz or more.

A variable optical attenuator according to the present invention includes the driving apparatus of the liquid crystal light modulator described above.

The configuration described above makes it possible to change an effective value of each frame of the drive signal according to modulation data, without increasing the frequency of the reference clock.

EFFECT OF INVENTION

The driving apparatus and the light modulating apparatus according to the present invention effect an enhanced quality of the output light of the liquid crystal light modulator.

BRIEF DESCRIPTION OF THE DRAWINGS

FIG. 1A is a block diagram of a configuration of a driving apparatus according to an embodiment;

FIG. 1B is a block diagram of a variation example of the driving apparatus shown in FIG. 1A;

FIG. 2 is a diagram of an example of a drive signal supplied to a liquid crystal light modulator by the driving apparatus shown in FIG. 1A or 1B;

FIG. 8 is a diagram of an output waveform of the first output circuit shown in FIG. 7;

FIG. 10 is a graph of an example of light intensity characteristic and waveform response characteristic when the liquid crystal light modulator is used as an VOA;

FIG. 16 is a diagram of another example of the drive signal supplied to the liquid crystal light modulator by the conventional driving apparatus.

DETAILED DESCRIPTION OF THE PREFERRED EMBODIMENTS

Figure 3:
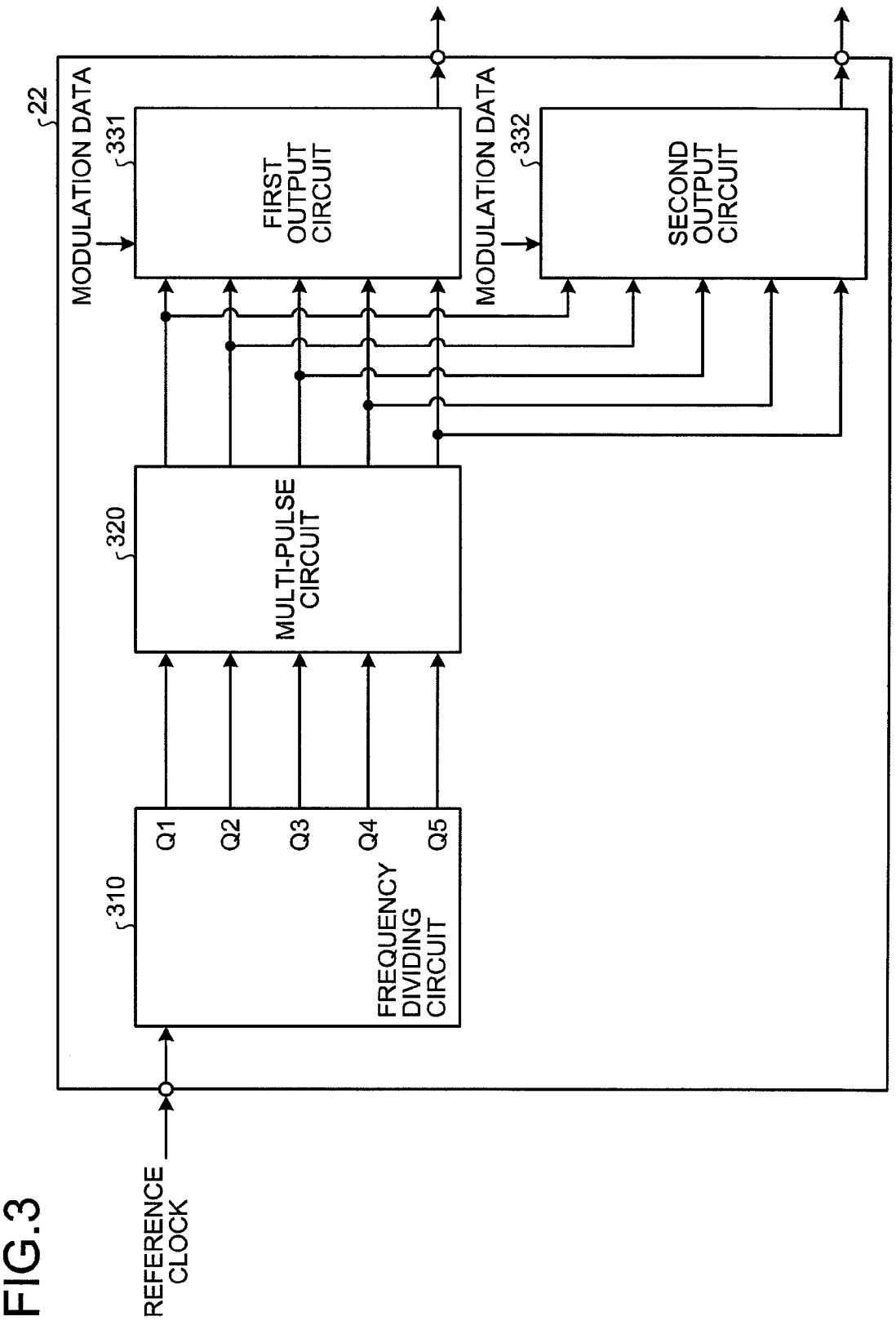
FIG. 3 is a block diagram of a specific configuration example of a segment drive circuit shown in FIG. 1A or 1B.

Referring to the accompanying drawings, exemplary embodiments of a driving apparatus and a light modulating apparatus according to the present invention are explained in detail below.

Embodiment

Configuration of Driving Apparatus

FIG. 1A is a block diagram of a configuration of the driving apparatus according to the embodiment. A liquid crystal light modulator 11 shown in FIG. 1A is configured to have a common electrode 14 and a segment electrode 15 provided on opposing faces of a pair of glass or silicon substrates 12 and 13, respectively, and polarizing plates 16 and 17 provided on the opposite faces thereof, respectively. A liquid crystal 19 is encapsulated in a space sealed by the substrates 12 and 13 and a sealing material 18.

Modulation data (level data) is input to a driving apparatus 21. The driving apparatus 21 changes an effective value of each frame of a segment signal (drive signal) supplied to the liquid crystal light modulator 11 according to the modulation data. The frame is a period during which an effective voltage based on the modulation data is applied to a pixel, and is a control unit for optical modulation. For example, the frame is a section that includes plural pulses, the number of which corresponds to the number of levels of the modulation data, of the reference clock. In this case, the frame is the section for which the amount of change of the pulse width of the drive signal when the modulation data changes by one level is continued for the number of levels. The effective value of the frame is constant except when the modulation data is changed. The driving apparatus 21 includes a segment drive circuit 22, a common drive circuit 23, a control circuit 24, and an analog power source circuit 25.

The segment drive circuit 22 is a generating unit that generates the drive signal according to the modulation data. The segment drive circuit 22 is a supplying unit that supplies the generated drive signal to the liquid crystal light modulator 11 as the segment signal. Specifically, the drive signal generated by the segment drive circuit 22 is applied to the segment electrode 15 as a segment signal. In the present invention, a static drive is employed in which plural segment electrodes 15 are arranged and each applied with a corresponding segment signal. The common drive circuit 23 generates a common signal applied to the common electrode 14 based on a polarity signal.

The control circuit 24 supplies the reference clock to control the timing in performing the pulse width modulation to the segment drive circuit 22. The control circuit 24 supplies the polarity signal to the common drive circuit 23. The analog power supply circuit 25 supplies a direct current (DC) voltage for performing voltage amplification to the segment drive circuit 22 and the common drive circuit 23. The segment drive circuit 22 and the common drive circuit 23 generate the segment signal and the common signal of a voltage level suitable for driving the liquid crystal, respectively, based on the DC voltage supplied by the analog power source circuit 25.

FIG. 1B is a block diagram of a variation example of the driving apparatus shown in FIG. 1A. As shown in FIG. 1B, the liquid crystal light modulator 11 may be formed as a reflective element. In such case, the polarizing plate is arranged only on the side of one substrate 12 (polarizing plate 16) and the segment electrode 15 is a reflective electrode formed by a film of metal of high reflectance such as Al.

(Example of Drive Signal)

FIG. 2 is a diagram of an example of the drive signal supplied to the liquid crystal light modulator by the driving apparatus shown in FIG. 1A or 1B. In FIG. 2, a case in which the pulse width of the drive signal is changed by 32 levels is described. Each of the frames T1 and T2 indicates the period during which the effective voltage based on the modulation data is applied to the liquid crystal light modulator 11. Here, the frames T1 and T2 are set to have the same length. A reference clock 210 is the reference clock supplied to the segment drive circuit 22 from the control circuit 24. Each of the frames T1 and T2 is the period for 32 cycles of the reference clock 210.

A drive signal 220 is a drive signal generated so as to have the pulse width of 6/32 level. A drive signal 230 is a drive signal generated so as to have the pulse width of 7/32 level. A drive signal 240 is a drive signal generated so as to have the pulse width of 8/32 level. As shown in the drive signals 220, 230, and 240, the segment drive circuit 22 of the driving apparatus 21 generates the drive signal containing plural pulses in each frame.

The segment drive circuit 22 of the driving apparatus 21 generates the drive signal containing the number of pulses that corresponds to the modulation data in each frame. Specifically, the drive signal 220 contains six pulses in each frame, the drive signal 230 seven pulses in each frame, and the drive signal 240 eight pulses in each frame. Similarly, the number of pulses contained in each frame is increased as the modulation data is increased.

A drive signal 250 is a drive signal generated so as to have the pulse width of 9/32 level. A drive signal 260 is a drive signal generated so as to have the pulse width of 10/32 level. As shown in the drive signals 240, 250, and 260, the segment drive circuit 22 of the driving apparatus 21 changes the pulse width according to the modulation data while keeping the number of pulses in each frame at a predetermined number (here, eight) when the number of pulses has reached the predetermined number. The segment drive circuit 22 increases the width of one pulse out of the predetermined number of pulses when the modulation data increases by one level. The predetermined number of pulses for each frame is not limited to eight, and may be four, for example, or any other number.

For example, as shown in FIG. 2, the segment drive circuit 22 generates the drive signal 250 in which the widths of an eighth pulse 251 of the first frame T1 and an eighth pulse 252 of the next frame T2 are increased, when the modulation data increases by one level from the state in which the drive signal 240 is generated. The segment drive circuit 22 generates the drive signal 260 in which the widths of a seventh pulse 261 of the first frame T1 and a seventh pulse 262 of the next frame T2 are increased, when the modulation data increases by one level from the state in which the drive signal 250 is generated.

Similarly, the driving apparatus 21 performs a multi-pulse drive of generating the drive signal containing plural pulses in each frame. The driving apparatus 21 controls the effective value of the drive signal according to the modulation data by increasing the number of pulses contained in each frame in accordance with the increase of the modulation data. The driving apparatus 21 may also control the effective value of the drive signal according to the modulation data by increasing the width of pulses contained in each frame in accordance with the increase of the modulation data.

As shown in FIG. 2, the driving apparatus 21 may increase the number of pluses contained in each frame in accordance with the increase of the modulation data when the number of pulses contained in each frame is less than the predetermined number (here, eight). In this case, the driving apparatus 21 increases the width of the pulses contained in each frame T1 in accordance with the increase of the modulation data when the number of pulses contained in each frame has reached the predetermined number.

The multi-pulse drive by this driving apparatus 21 enables a high-frequency drive of the liquid crystal light modulator 11 since each frame contains plural pulses. This makes it possible to shorten the interval between consecutive pulses in achieving a predetermined effective value for each frame. Since the pulse waveform response of the liquid crystal light modulator 11 employing a liquid crystal material of high-speed response depends heavily on the pulse interval, such a multi-pulse drive can suppress the pulse waveform response without increasing the frame frequency.

Since the frequency is not required to be increased, the frequency of the reference clock that determines the resolution of the drive signal can be lowered. This makes it possible to achieve lower power consumption and reduction of the high-frequency noise.

FIG. 2 illustrates two frames, namely, the former frame T1 and the latter frame T2. The former frame T1 is formed by pulses each of which has a positive voltage. The latter frame T2 is formed by pulses each of which has a negative voltage. Therefore, the polarity is reversed between the two frames. Since the two frames are the same in all respects except for the polarity, the two frames have the same effective value. Since one frame is followed by another frame with a reversed polarity, the positive and negative voltages of two frames cancel each other out, thereby preventing the application of the direct current (DC). When the frequency is lowered, however, even if driving is performed so that the direct current portion becomes zero, the effect of the DC offset due to mobile ion appears and lowers the reliability of the light modulating apparatus. Therefore, it is preferable that the driving is performed at high frequency. This will be described in detail later.

(Specific Configuration Example of Segment Drive Circuit)

FIG. 3 is a block diagram of a specific configuration example of the segment drive circuit shown in FIG. 1A or 1B. As shown in FIG. 3, the segment drive circuit 22 (see FIG. 1A or 1B) includes a frequency dividing circuit 310, a multi-pulse circuit 320, a first output circuit 331, and a second output circuit 332. The reference clock supplied from the control circuit 24 is input to the frequency dividing circuit 310.

The frequency dividing circuit 310 divides the frequency of the input reference clock by five and outputs five frequency-divided signals (Q1 through Q5) after the frequency division to the multi-pulse circuit 320. Each frequency-divided signal output from the frequency dividing circuit 310 will be described later (see, for example, FIG. 4). The multi-pulse circuit 320 interchanges the frequency-divided signals output from the frequency dividing circuit 310 and outputs the signals to the first output circuit 331 and the second output circuit 332. The configuration example of the multi-pulse circuit 320 and each signal output from the multi-pulse circuit 320 will be described later (see, for example, FIGS. 5 and 6).

Each signal output from the multi-pulse circuit 320 and the modulation data are input to the first output circuit 331. The first output circuit 331 modulates each signal output from the multi-pulse circuit 320 based on the modulation data, and outputs the modulated signal as the drive signal. Each signal output from the multi-pulse circuit 320 and the modulation data are also input to the second output circuit 332. The second output circuit 332 modulates each signal output from the multi-pulse circuit 320 based on the modulation data, and outputs the modulated signal as the drive signal.

Here, a configuration is described in which the first output circuit 331 and the second output circuit 332 are provided and two drive signals are output. Alternatively, a configuration may be adopted in which the second output circuit 332 is omitted when only one drive signal is required. A configuration may be adopted in which three or more output circuits are provided when three or more drive signals are required. Thus, when using different drive signals for different segment electrodes, it is necessary to provide as many output circuits as the segment electrodes.

Figure 4:
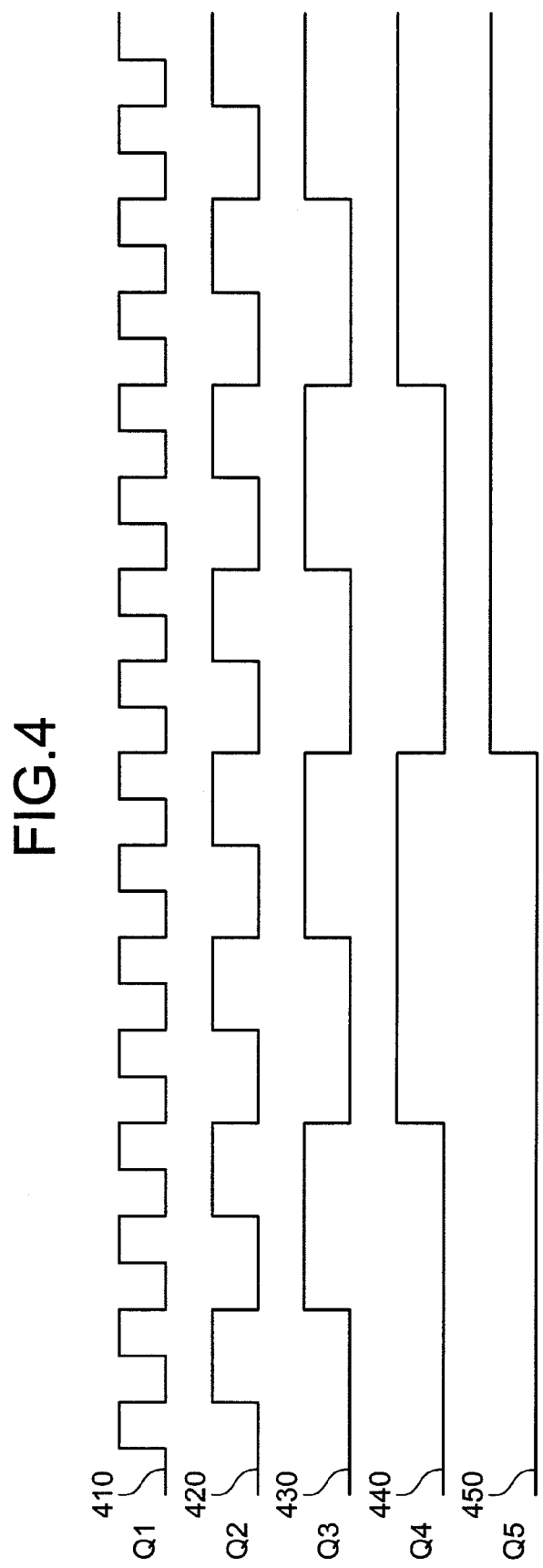
FIG. 4 is a diagram of an output waveform of a frequency dividing circuit shown in FIG. 3.

FIG. 4 is a diagram of an output waveform of the frequency dividing circuit shown in FIG. 3. As shown in FIG. 4, the frequency dividing circuit 310 (see FIG. 3) outputs a first frequency-divided signal 410 (Q1), a second frequency-divided signal 420 (Q2), a third frequency-divided signal 430 (Q3), a fourth frequency-divided signal 440 (Q4), and a fifth frequency-divided signal 450 (Q5). The first frequency-divided signal 410 is a frequency-divided signal of the same frequency as that of the reference clock input to the frequency dividing circuit 310. The second frequency-divided signal 420 is a frequency-divided signal of the frequency half of that of the reference clock input to the frequency dividing circuit 310.

The third frequency-divided signal 430 is a frequency-divided signal of the frequency one quarter of that of the reference clock input to the frequency dividing circuit 310. The fourth frequency-divided signal 440 is a frequency-divided signal of the frequency one eighth of that of the reference clock input to the frequency dividing circuit 310. The fifth frequency-divided signal 450 is a frequency-divided signal of the frequency equal to one sixteenth of that of the reference clock input to the frequency dividing circuit 310.

Figure 5:
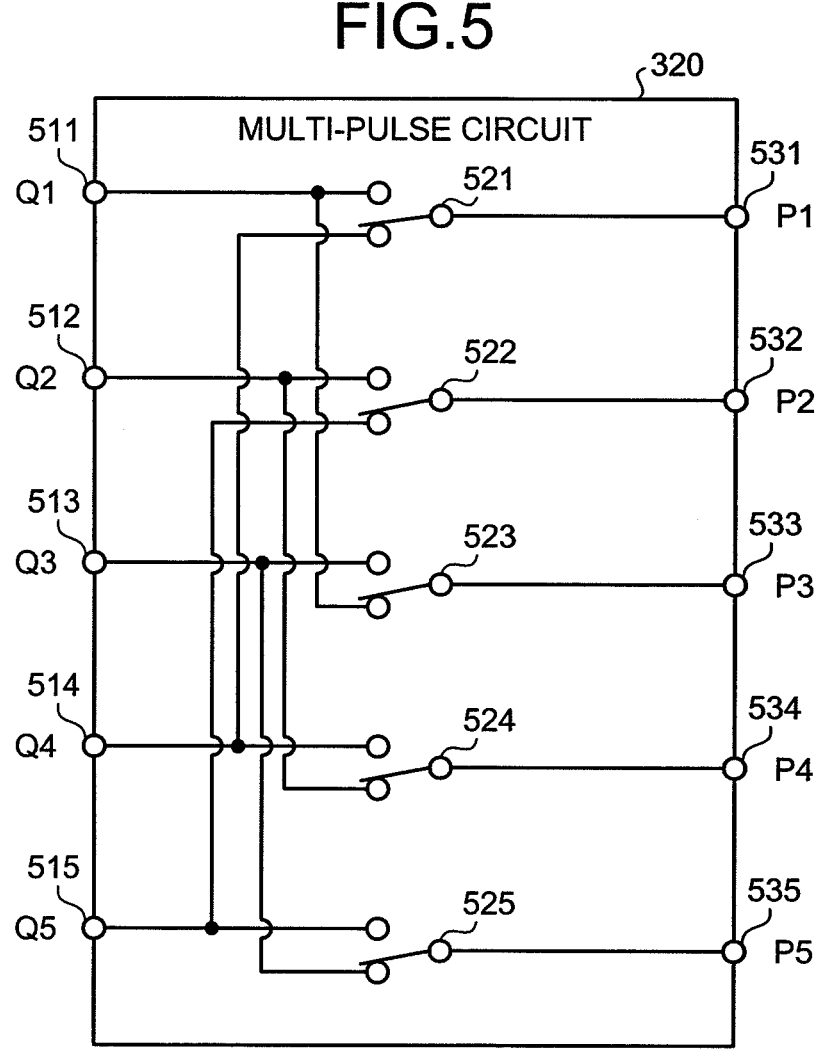
FIG. 5 is a circuit diagram of a specific configuration example of a multi-pulse circuit shown in FIG. 3.

FIG. 5 is a circuit diagram of a specific configuration example of the multi-pulse circuit shown in FIG. 3. As shown in FIG. 5, the multi-pulse circuit 320 includes a first input unit 511 through a fifth input unit 515, a first changeover switch 521 through a fifth changeover switch 525, a first output unit 531 through a fifth output unit 535, and a changeover control unit (not shown).

The frequency-divided signals (Q1 through Q5) output from the frequency dividing circuit 310 are input to the first input unit 511 through the fifth input unit 515, respectively. The first input unit 511 outputs the input frequency-divided signal (Q1) to the first changeover switch 521 and the third changeover switch 523. The second input unit 512 outputs the input frequency-divided signal (Q2) to the second changeover switch 522 and the fourth changeover switch 524.

The third input unit 513 outputs the input frequency-divided signal (Q3) to the third changeover switch 523 and the fifth changeover switch 525. The fourth input unit 514 outputs the input frequency-divided signal (Q4) to the fourth changeover switch 524 and the first changeover switch 521. The fifth input unit 515 outputs the input frequency-divided signal (Q5) to the fifth changeover switch 525 and the second changeover switch 522.

The first changeover switch 521 switches between a first path and a second path that output the signal from the first input unit 511 and the signal from the fourth input unit 514, respectively, to the first output unit 531. The second changeover switch 522 switches between a first path and a second path that output the signal from the second input unit 512 and the signal from the fifth input unit 515, respectively, to the second output unit 532.

The third changeover switch 523 switches between a first path and a second path that output the signal from the third input unit 513 and the signal from the first input unit 511, respectively, to the third output unit 513. The fourth changeover switch 524 switches between a first path and a second path that output the signal from the fourth input unit 514 and the signal from the second input unit 512, respectively, to the fourth output unit 534.

The fifth changeover switch 525 switches between a first path and a second path that output the signal from the fifth input unit 515 and the signal from the third input unit 513, respectively, to the fifth output unit 535. The first output unit 531 through the fifth output unit 535 output the signals (P1 through P5) from the first changeover switch 521 through the fifth changeover switch 525 to the first output circuit 331 and the second output circuit 332. The changeover control unit controls the first changeover switch 521 through the fifth changeover switch 525 to select the first path or the second path.

By controlling the first changeover switch 521 through the fifth changeover switch 525 to select the first path by the changeover control unit, the frequency-divided signals input to the multi-pulse circuit 320 from the frequency dividing circuit 310 are output in an unchanged order. By controlling the first changeover switch 521 through the fifth changeover switch 525 to select the second path by the changeover control unit, the frequency-divided signals input to the multi-pulse circuit 320 from the frequency dividing circuit 310 are output in a changed order.

The output waveform of the multi-pulse circuit 320 when each of the first changeover switch 521 through the fifth changeover switch 525 selects the first path is the same as the output waveform shown in FIG. 4, and therefore the description thereof is omitted. A drive signal containing one pulse in each frame can be generated by selecting the first path by the first changeover switch 521 through the fifth changeover switch 525 so that the signals are not interchanged. Thus, an appropriate drive signal suitable for an application, characteristics of the liquid crystal, etc., can be generated.

When generating a drive signal containing plural pulses in each frame, the changeover control unit of the multi-pulse circuit 320 controls the first changeover switch 521 through the fifth changeover switch 525 to select the second path. The output waveform of the multi-pulse circuit 320 in this case will be described in FIG. 6. While the multi-pulse circuit 320 shown in FIG. 5 is configured to be capable of selectively outputting the signals in a changed order or in an unchanged order, the configuration may be employed in which the multi-pulse circuit 320 always outputs the signals in a changed order.

Figure 6:
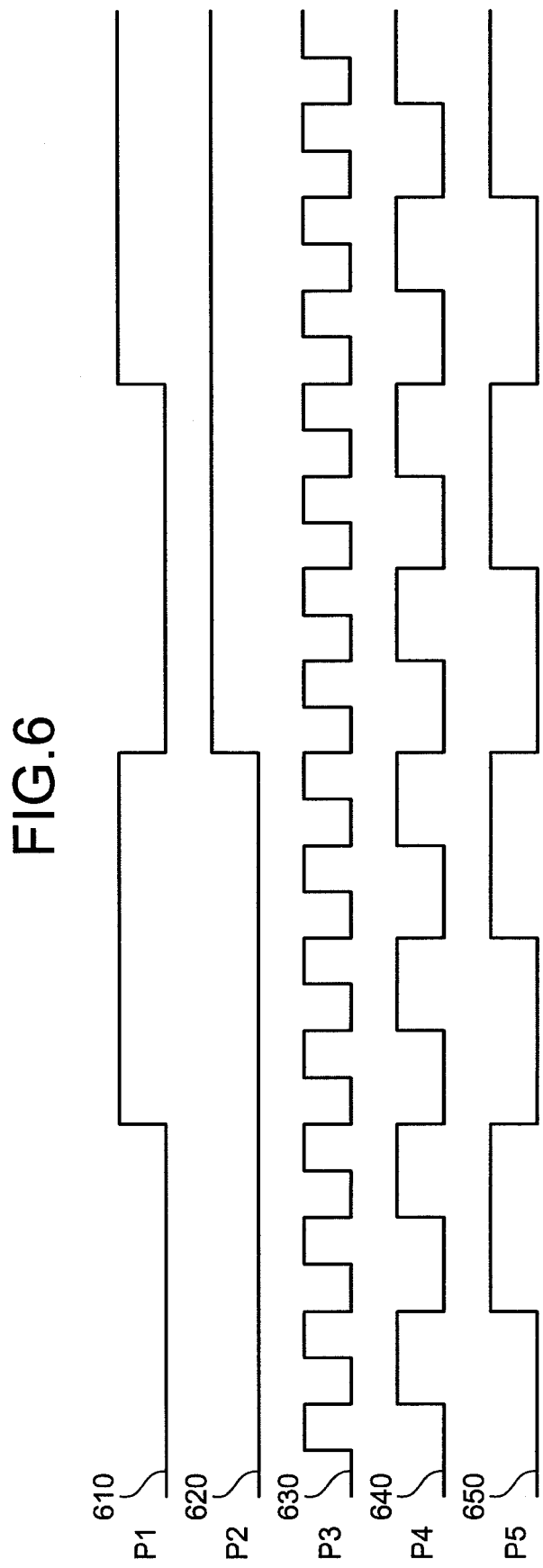
FIG. 6 is a diagram of an output waveform of the multi-pulse circuit (second path) shown in FIG. 5.

FIG. 6 is a diagram of an output waveform of the multi-pulse circuit (second path) shown in FIG. 5. A first output signal 610 shown in FIG. 6 is the signal (P1) output from the first output unit 531 of the multi-pulse circuit 320 and is the same as the fourth frequency-divided signal 440 shown in FIG. 4. A second output signal 620 is the signal (P2) output from the second output unit 532 of the multi-pulse circuit 320 and is the same as the fifth frequency-divided signal 450 shown in FIG. 4.

A third output signal 630 is the signal (P3) output from the third output unit 533 of the multi-pulse circuit 320 and is the same as the first frequency-divided signal 410 shown in FIG. 4. A fourth output signal 640 is the signal (P4) output from the fourth output unit 534 of the multi-pulse circuit 320 and is the same as the second frequency-divided signal 420 shown in FIG. 4.

A fifth output signal 650 is the signal (P5) output from the fifth output unit 535 of the multi-pulse circuit 320 and is the same as the third frequency-divided signal 430 shown in FIG. 4. Similarly, the output signals of the multi-pulse circuit 320 when the first changeover switch 521 through the fifth changeover switch 522 select the second path are the frequency-divided signals shown in FIG. 4 with the order thereof changed. Here, the order of the outputs of the frequency dividing circuit 310 is shifted by two by the multi-pulse circuit 320.

Figure 7:
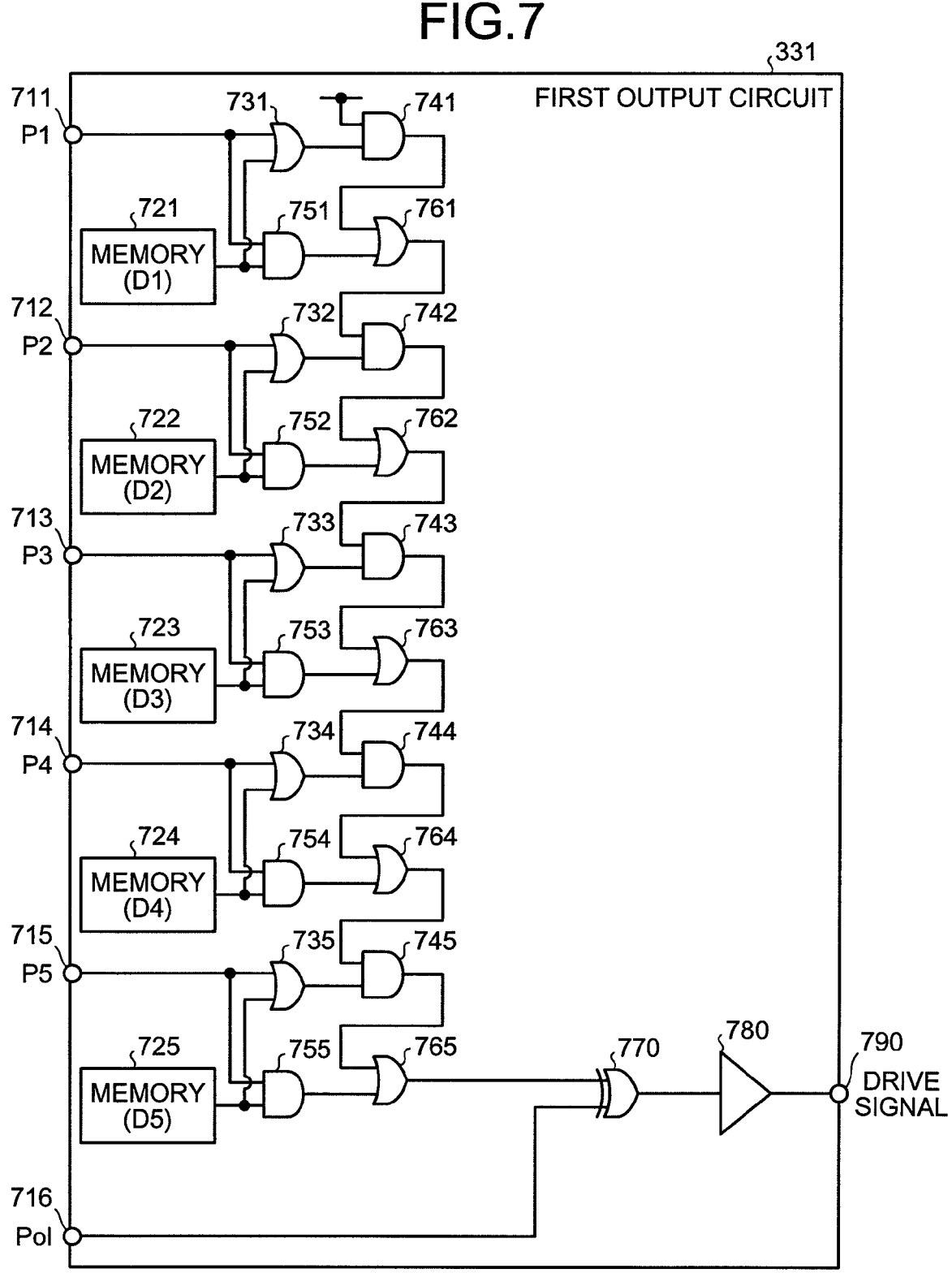
FIG. 7 is a circuit diagram of a specific configuration example of a first output circuit shown in FIG. 3.

FIG. 7 is a circuit diagram of a specific configuration example of the first output circuit shown in FIG. 3. As shown in FIG. 7, the first output circuit 331 (see FIG. 3) includes input units 711 through 716, memories 721 through 725, OR circuits 731 through 735, AND circuits 741 through 745, AND circuits 751 through 755, OR circuits 761 through 765, an exclusive OR circuit 770, a buffer 780, and an output unit 790.

If the modulation data is represented by 5 bits (0 through 31) called as D1 through D5, the memories 721 through 725 store D1 through D5, respectively. For example, if the value of the modulation data is two (00010 in binary), the memories 721 through 725 store 0, 1, 0, 0, and 0, respectively. If the value of the modulation data is three (00011 in binary), the memories 721 through 725 store 1, 1, 0, 0, and 0, respectively.

The signal (P1) output from the first output unit 531 of the multi-pulse circuit 320 is input to the input unit 711. The input unit 711 outputs the input signal to the OR circuit 731 and the AND circuit 751. The OR circuit 731 outputs a signal indicative of logical OR of the signal output from the input unit 711 and the modulation data (D1) stored in the memory 721 to the AND circuit 741.

One input of the AND circuit 741 is connected to the OR circuit 731 and the other input thereof is pulled up. Thus, when at least either one of the signal (P1) output from the first output unit 531 and the modulation data (D1) stored in the memory 721 is 1, the output of the OR circuit 731 is 1 and the output of the AND circuit 741 is 1. When the signal (P1) output from the first output unit 531 and the modulation data (D1) stored in the memory 721 are 0, the output of the OR circuit 731 is 0 and the output of the AND circuit 741 is 0.

The AND circuit 751 outputs a signal indicative of logical AND of the signal output from the input unit 711 and the modulation data stored in the memory 721 to the OR circuit 761. The OR circuit 761 outputs a signal indicative of logical OR of the signal output from the AND circuit 741 and the signal output from the AND circuit 751 to the AND circuit 742.

The signal (P2) output from the second output unit 532 of the multi-pulse circuit 320 is input to the input unit 712. The input unit 712 outputs the input signal to the OR circuit 732 and the AND circuit 752. The OR circuit 732 outputs a signal indicative of logical OR of the signal output from the input unit 712 and the modulation data (D2) stored in the memory 722 to the AND circuit 742. The AND circuit 742 outputs a signal indicative of logical AND of the signal output from the OR circuit 761 and the signal output from the OR circuit 732 to the OR circuit 762.

The AND circuit 752 outputs a signal indicative of logical AND of the signal output from the input unit 712 and the modulation data stored in the memory 722 to the OR circuit 762. The OR circuit 762 outputs a signal indicative of logical OR of the signal output from the AND circuit 742 and the signal output from the AND circuit 752 to the AND circuit 743.

The signal (P3) output from the third output unit 533 of the multi-pulse circuit 320 is input to the input unit 713. The input unit 713 outputs the input signal to the OR circuit 733 and the AND circuit 753. The OR circuit 733 outputs a signal indicative of logical OR of the signal output from the input unit 713 and the modulation data (D3) stored in the memory 723 to the AND circuit 743. The AND circuit 743 outputs a signal indicative of logical AND of the signal output from the OR circuit 762 and the signal output from the OR circuit 733 to the OR circuit 763.

The AND circuit 753 outputs a signal indicative of logical AND of the signal output from the input unit 713 and the modulation data stored in the memory 723 to the OR circuit 763. The OR circuit 763 outputs a signal indicative of logical OR of the signal output from the AND circuit 743 and the signal output from the AND circuit 753 to the AND circuit 744.

The signal (P4) output from the fourth output unit 534 of the multi-pulse circuit 320 is input to the input unit 714. The input unit 714 outputs the input signal to the OR circuit 734 and the AND circuit 754. The OR circuit 734 outputs a signal indicative of logical OR of the signal output from the input unit 714 and the modulation data (D4) stored in the memory 724 to the AND circuit 744. The AND circuit 744 outputs a signal indicative of logical AND of the signal output from the OR circuit 763 and the signal output from the OR circuit 734 to the OR circuit 764.

The AND circuit 754 outputs a signal indicative of logical AND of the signal output from the input unit 714 and the modulation data stored in the memory 724 to the OR circuit 764. The OR circuit 764 outputs a signal indicative of logical OR of the signal output from the AND circuit 744 and the signal output from the AND circuit 754 to the AND circuit 745.

The signal (P5) output from the fifth output unit 535 of the multi-pulse circuit 320 is input to the input unit 715. The input unit 715 outputs the input signal to the OR circuit 735 and the AND circuit 755. The OR circuit 735 outputs a signal indicative of logical OR of the signal output from the input unit 715 and the modulation data (D5) stored in the memory 725 to the AND circuit 745. The AND circuit 745 outputs a signal indicative of logical AND of the signal output from the OR circuit 764 and the signal output from the OR circuit 735 to the OR circuit 765.

The AND circuit 755 outputs a signal indicative of logical AND of the signal output from the input unit 715 and the modulation data stored in the memory 725 to the OR circuit 765. The OR circuit 765 outputs a signal indicative of logical OR of the signal output from the AND circuit 745 and the signal output from the AND circuit 755 to the exclusive OR circuit 770.

A polarity signal Pol is input to the input unit 716. The input unit 716 outputs the input polarity signal Pol to the exclusive OR circuit 770. The exclusive OR circuit 770 outputs a signal indicative of exclusive OR of the signal output from the OR circuit 765 and the polarity signal Pol output from the input unit 716 to the buffer 780. The buffer 780 amplifies, and outputs the signal from the exclusive OR circuit 770 to the output unit 790.

The output unit 790 outputs the signal from the buffer 780 as the drive signal. The drive signal output from the output unit 790 is applied to the segment electrode 15 of the liquid crystal light modulator 11 as the segment signal. While a specific configuration example of the first output circuit 331 shown in FIG. 3 is described in FIG. 7, the same holds true to the second output circuit 332 shown in FIG. 3 and the third and subsequent output circuits.

FIG. 8 is a diagram of an output waveform of the first output circuit shown in FIG. 7. A drive signal 801 shown in FIG. 8 is the drive signal of one frame output from the first output circuit 331 when the modulation data n is 1. Similarly, the drive signals 802 through 812 are the drive signals of one frame output from the output circuit when the modulation data n is 2 through 12, respectively.

As shown in FIG. 8, the driving apparatus 21 increases the number of pulses contained in each frame in accordance with an increase of the modulation data n when the number of pulses contained in each frame is less than four. The driving apparatus 21 increases the width of the pulses contained in each frame in accordance with the increase of the modulation data n when the number of pulses contained in each frame has reached four.

In increasing the width of the pulse, the driving apparatus 21 increases the width of one of the pulses contained in the frame each time the modulation data n increases by one. While the outputs of the first output unit 531 when the modulation data n are 1 through 12 is described in FIG. 8, the first output unit 531 also outputs the drive signal with the pulse width increased each time the modulation data n increases by one when the modulation data n are 13 through 31.

(Waveform Response)

The waveform response (flicker) that can be reduced by the driving apparatus 21 according to the embodiment is described next. Referring to the drive signal 220 shown in FIG. 2, the frame has a period during which no pulse is applied. When this period becomes long, the liquid crystal layer is caused to respond and the waveform response (flicker) becomes large, except when the applied voltage is 0 V, namely, the offset value is 0 V.

Therefore, it is considered to determine the longest period of this period (refresh period) from the application of one pulse to the application of another pulse to achieve a drive waveform with a reduced waveform response (flicker). The example of the multi-pulse driving method according to the present invention is described to have the former frame T1 followed by the latter frame T2 with the polarity reversed. In the following section, the waveform response is described taking a waveform of a simple pulse width modulation as an example, in which the former frame T1 and the latter frame T2 respectively include one pulse with the polarity reversed.

Figure 9A:
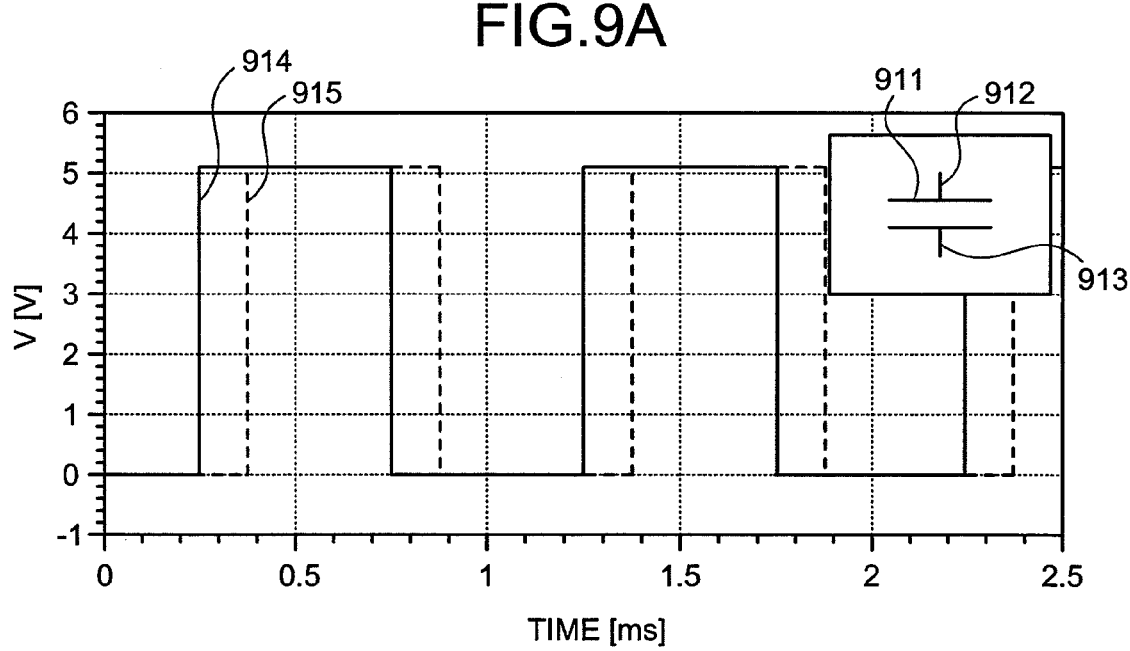
FIG. 9A is a diagram of a waveform of the voltage applied to each electrode of the liquid crystal light modulator.

FIG. 9A is a diagram of a waveform of the voltage applied to each electrode of the liquid crystal light modulator. In FIG. 9A, the horizontal axis represents time [ms] and the vertical axis represents voltage V [V]. A liquid crystal light modulator 911 represents the liquid crystal light modulator to which the drive signal is supplied. The liquid crystal light modulator 911 is a nematic liquid crystal. A waveform 914 shown in FIG. 9A indicates a change in the voltage applied to an electrode 912 of the liquid crystal light modulator 911. A waveform 915 represents a change in the voltage applied to an electrode 913 of the liquid crystal light modulator 911.

Figure 9B:
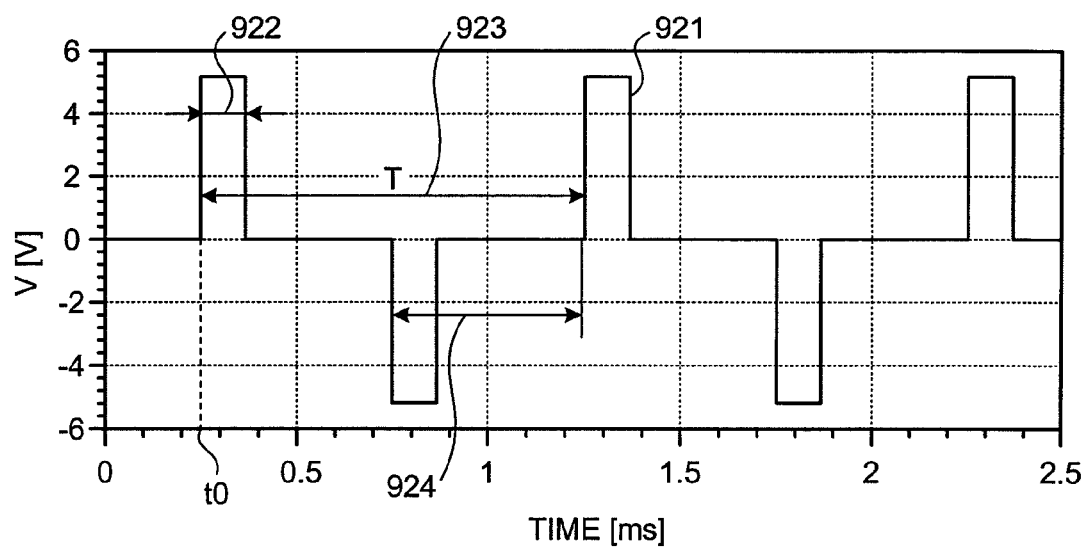
FIG. 9B is a diagram of a waveform of the voltage actually applied to a liquid crystal layer of the liquid crystal light modulator.

FIG. 9B is a diagram of a waveform of the voltage actually applied to the liquid crystal layer of the liquid crystal light modulator. In FIG. 9B, the horizontal axis represents time [ms] and the vertical axis represents voltage V [V]. A waveform 921 shown in FIG. 9B represents a change in the voltage actually applied to the liquid crystal layer of the liquid crystal light modulator 911 when the voltage shown in FIG. 9A is applied to the electrodes 912 and 913 of the liquid crystal light modulator 911, and corresponds to a composite waveform of the waveforms 914 and 915 shown in FIG. 9A.

Reference numeral 922 indicates the pulse width of the voltage applied to the liquid crystal layer of the liquid crystal light modulator 911. Reference numeral 923 indicates a drive cycle (T) of the voltage applied to the liquid crystal layer of the liquid crystal light modulator 911. FIG. 9B takes as an example a waveform of a simple pulse width modulation in which the former frame T1 and the latter frame T2 respectively include one pulse with the polarity reversed.

Here, since the effective voltage based on one piece of modulation data is applied by one pulse, one frame is the period from the application of a positive pulse to the application of a next negative pulse. Therefore, the drive cycle T in FIG. 9B corresponds to two times of one frame. Reference numeral 924 indicates the refresh period of the voltage applied to the liquid crystal layer of the liquid crystal light modulator 911, and specifically, is the period from the application of one pulse to the application of another pulse.

Figure 9C:
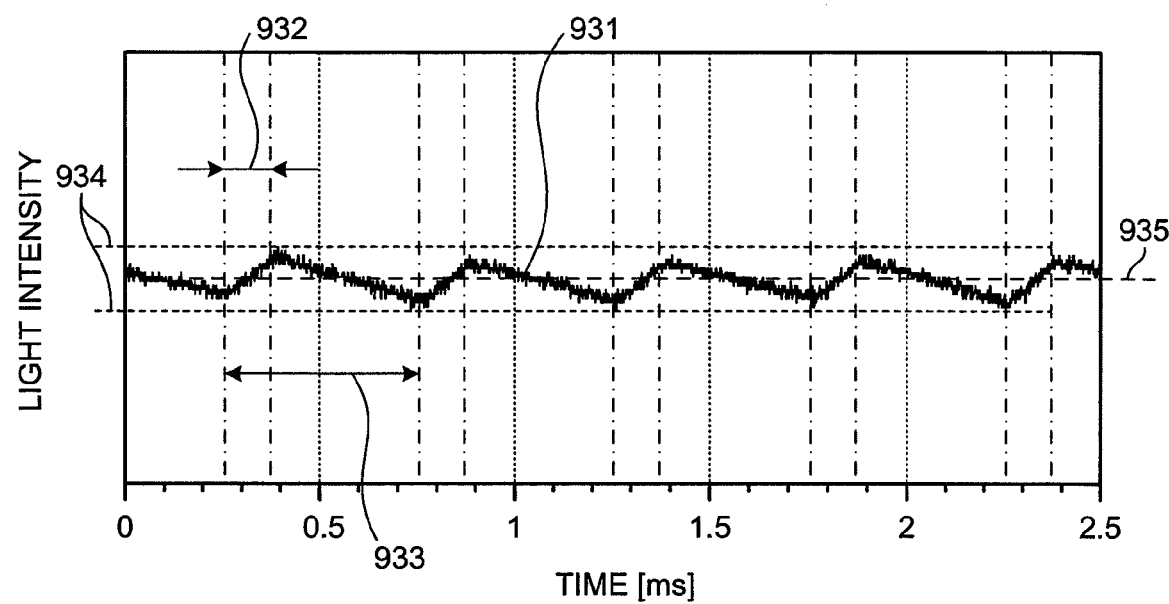
FIG. 9C is a diagram of a change in the intensity of the output light of the liquid crystal light modulator.

FIG. 9C is a diagram of a change in the intensity of the output light of the liquid crystal light modulator. In FIG. 9C, the horizontal axis represents time [ms] and the vertical axis represents light intensity (unit is arbitral). A waveform 931 of FIG. 9C represents an example of the change in the intensity of the output light of the liquid crystal light modulator 911 when the voltage shown in FIG. 9B is applied to the liquid crystal layer of the liquid crystal light modulator 911.

Reference numeral 932 indicates the change in the light intensity of the output light of the liquid crystal light modulator 911 corresponding to the pulse width. Reference numeral 933 indicates a refresh cycle corresponding to the refresh period of the output light of the liquid crystal light modulator 911. Reference numeral 934 indicates a fluctuation range of the light intensity corresponding to the waveform response of the output light of the liquid crystal light modulator 911. Since the outgoing light of the liquid crystal light modulator is output as a voltage value when detected by a photodetector (PD), this fluctuation range of the light intensity is proportional to the amplitude of fluctuating voltage Vp_p of the PD. Reference numeral 935 indicates an average value of the output light of the liquid crystal light modulator 911, and is proportional to the average voltage Vdc of the photodetector (PD).

The liquid crystal element such as the nematic liquid crystal responds to the effective value. The effective value Vrms of the drive voltage V can be expressed by the following equation (1). In the following equation (1), T represents a drive cycle (T) indicated by, for example, reference numeral 923 of FIG. 9B, V represents the voltage shown on the vertical axis of FIG. 9B, and t0 represents the time at which the voltage pulse applied to the liquid crystal layer rises.

(Equation 1)

$$Vrms = \sqrt{\left(\frac{1}{T}\int_{t0}^{t0+T} V^2 dt\right)} \qquad (1)$$

A high-speed liquid crystal light modulator responding at high speed responds to each pulse as shown in FIG. 9C, and digital noise (digital artifact) unrelated to an actual control signal to the liquid crystal layer appears as the waveform response (flicker). When the liquid crystal light modulator is used as a variable optical attenuator (VOA) for optical communication, such a flicker has an effect on the quality of the output light and characteristics of a communication module incorporating the liquid crystal light modulator. Therefore, it is preferable to make this flicker small. A qualitative evaluation method of this waveform response is described next.

FIG. 10 is a graph of an example of light intensity characteristic and waveform response characteristic when the liquid crystal light modulator is used as the VOA. The liquid crystal light modulator used as the VOA is a transmissive, parallel-oriented liquid crystal element in which polarizing axes of a pair of polarizing plates are arranged in parallel and the direction of the director of the liquid crystal is set to be inclined by 45 degrees with respect to the transmission axis of the polarizing plate. The cell gap of this liquid crystal light modulator is 10 μm, and MJ011580 produced by Merck Ltd. is used as the liquid crystal material.

In FIG. 10, the horizontal axis represents the effective value [Vrms] of the drive voltage and the vertical axis on the left represents the average voltage Vdc [V] of the photodetector proportional to the intensity of outgoing light of the VOA. The vertical axis on the right represents a residual waveform response ratio (RWR) indicating the degree of overlapping of the waveform response (flicker). The greater the flicker is, the greater the value of this residual waveform response ratio becomes. Waveform response characteristic 1010 indicates the characteristic of the residual waveform response ratio versus the effective value of the drive voltage. Light intensity characteristic 1020 indicates the characteristic of the average voltage Vdc of the photodetector corresponding to the light intensity versus the effective value of the drive voltage.

The waveform response characteristic 1010 and the light intensity characteristic 1020 shown in FIG. 10 indicate the light intensity characteristic and the waveform response characteristic when a drive voltage having PWM (pulse width modulation) waveform is applied to the VOA. In this example, the frequency of the drive signal is 1 kHz (refresh frequency at 2 kHz), measuring temperature is 10 [° C.], and measuring wavelength is 1550 nm.

The average voltage Vdc of the photodetector is the value obtained by an oscilloscope that reads a voltage converted from the output of the photodetector (PD) that receives the output light of the VOA. Since the output of the PD is proportional to the intensity of the received light, the output of the PD can be regarded as the intensity of the output light shown in FIG. 9C. The voltage output of the PD is measured in a range in which the output is proportional to the light intensity. Here, the residual waveform response ratio RWR is defined as shown in the equation (2).

(Equation 2)

$$RWR = \frac{I_{p\_p}}{Idc_{max}} = \frac{V_{p\_p} - V_{p\_p}(0)}{Vdc_{max}} \quad (2)$$

Here, Ip_p is the fluctuation of the light intensity due to the waveform response and corresponds to reference numeral 934 of FIG. 9C. Idcmax is the maximum of the average light intensity. Vp_p is the fluctuating voltage of the PD due to the waveform response and Vp_p(0) is the fluctuating voltage of the PD when the effective value is 0 [Vrms]. In principle, when the effective value is 0 [Vrms], there is no fluctuation due to the waveform response. However, Vp_p(0) appears due to noise or fluctuation of the PD.

Therefore, to calculate the effective magnitude of the Ip_p, the value (Vp_p–Vp_p(0)) obtained by subtracting the Vp_p(0) from Vp_p is regarded as the fluctuation of the voltage of the PD proportional to the light intensity due to the waveform response. Vdcmax is the average output voltage of the PD when the output average voltage becomes maximum at the photodetector.

The waveform response characteristic 1010 shown in FIG. 10, which indicates the degree of the flicker, has its peak between the maximum value and the minimum value of the light intensity characteristic 1020. This can be attributed that when the drive voltage of the PWM is low, movement of the liquid crystal molecules is small and thus the waveform response is small, and that when the drive voltage of the PWM is high, the effect of the waveform response is not likely to be significant due to the narrow interval between PWM waveforms and thus the waveform response becomes small.

Under the conditions of FIG. 10, when the drive voltage of the PWM is low, the light intensity is not 0 from the beginning due to the initial retardation of the liquid crystal. Soon after the drive voltage exceeds 2V, the incoming polarized light output from the polarizing plate on the input side rotates by π/2 so as to be perpendicular to the polarizer on the output side (closed state), thereby making the light intensity close to 0. As a result, the waveform response characteristic curve is observed to have a small peak around 2V as well.

As an index to experimentally determine the optimum refresh period of the pulse used for the drive signal, the maximum waveform response ratio RWM that is a logarithm of the maximum value of the residual waveform response ratio regarded as the maximum value of the RWR is defined by the following equation (3). The smaller the maximum waveform response ratio RWM is, the smaller the degree of the flicker is supposed to be. In the following equation (3), the maximum waveform response ratio RWM is obtained from the value of the residual waveform response ratio RWRmax when the waveform response characteristic 1010 becomes maximum.

(Equation 3)

$$RWM = 10 \log_{10} RWR\,max \quad (3)$$

As shown in FIG. 10, since the effect of the waveform response (degree of flicker) becomes maximum at RWRmax at which the residual waveform response ratio RWR becomes maximum in the operation range of the liquid crystal light modulator, the waveform of the drive signal is studied taking as the index the maximum waveform response ratio RWM calculated by obtaining a logarithm of RWRmax.

Figure 11:
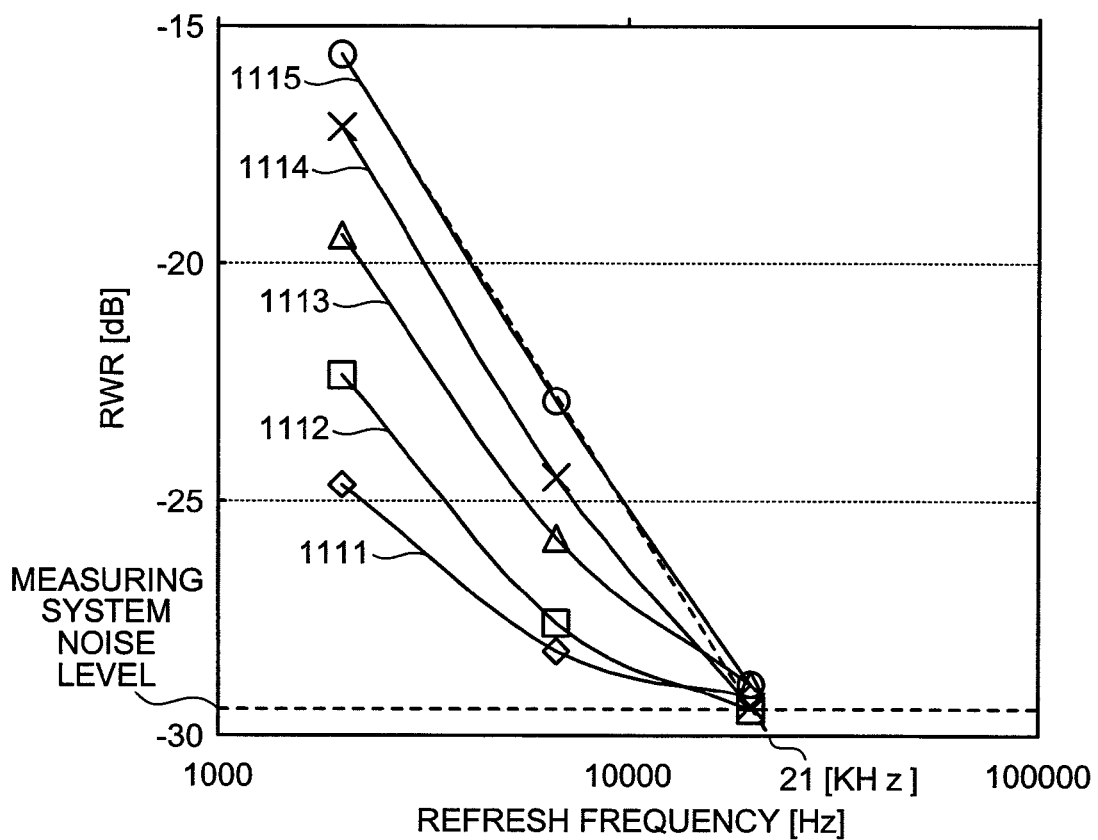
FIG. 11 is a graph of a relationship of the maximum waveform response ratio and the refresh frequency.

FIG. 11 is a graph of a relationship of the maximum waveform response ratio and the refresh frequency. The refresh frequency is the cycle of the refresh period expressed in frequency. The refresh cycle is the period from the application of one pulse to the application of another pulse, as described above. In FIG. 11, the horizontal axis represents the refresh frequency [Hz] of the drive signal and the vertical axis represents the maximum waveform response ratio RWM [dB] of the equation (3). Characteristics 1111 through 1115 indicate the characteristics of the maximum waveform response ratio RWM versus refresh frequency when the operation temperature is −7 [° C.], 10 [° C.], 25 [° C.], 50 [° C.], and 70 [° C.], respectively.

At each operation temperature, the higher the refresh frequency is, the smaller the maximum waveform response ratio RWM becomes. The higher the temperature is, the greater the RWM becomes, even at the same refresh frequency. In the results shown in FIG. 11, since the VOA is formed by a transmissive liquid crystal light modulator and the noise level of a measurement system used for this measurement is around −30 [dB], all curves come closer to each other around −30 [dB].

Assuming that the operation temperature is from −7 [° C.] to 70 [° C.], the results shown in FIG. 11 indicate that, to suppress the maximum waveform response ratio RWM below, for example, −25 [dB], the refresh frequency is required to be 10000 [Hz] (10 [kHz]) or more, taking into consideration 70 [° C.] as the severest condition. It is also indicated that, considering the noise floor in view of the fact that the noise level of the measuring system is around −30 dB and considering the characteristics (dotted line extended from the characteristic 1115 of FIG. 11) extrapolated from the curve at the low refresh frequency of the graph of 70 [° C.], the refresh frequency is required to be about 21 [kHz] or more, to suppress the maximum waveform response ratio RWM below −30 [dB].

Here, a transmissive, polarization-dependent liquid crystal light modulator with the cell gap of 10 [μm] is used, and a drive signal of 5 [V] generated by the pulse width modulation is used. Generally, when the liquid crystal light modulator of the present invention is used as an VOA, and when the amount of attenuation of the VOA is set at the range of 0 through −20 [dB], it is considered to be practical if the waveform response (flicker) is suppressed below −25 through −30 [dB] in terms of the RWM.

Therefore, it is preferable that the refresh frequency is set at 10 [kHz] or more, or at about 21 [kHz] or more. In other words, considering the application to the driving method of the present invention, the longest period with no pulse applied within the frame except when the applied voltage is 0 V can be considered to be equal to the inverse number of the frequency in light of the waveform described above, and is preferably set at $1 \times 10^{-4}$ [sec] (=1/10 [kHz]) or less, or more preferably at $5 \times 10^{-5}$ [sec] (≈1/21 [kHz]) or less.

(About Vcom Shift)

Figure 12A:
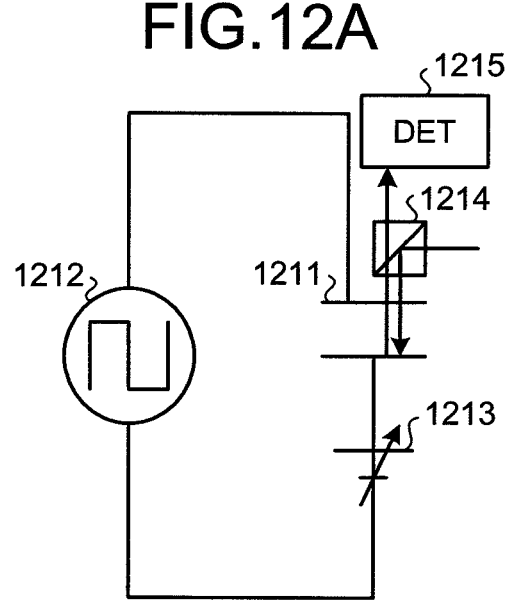
FIG. 12A is a diagram of an experimental circuit for evaluation of Vcom shift.

FIG. 12A is a diagram of an experimental circuit for evaluation of Vcom shift. A liquid crystal light modulator 1211 shown in FIG. 12A is a VOA with a reflective liquid crystal light modulator. A power source 1212 supplies drive voltage to the liquid crystal light modulator 1211. An external DC power source 1213 applies DC voltage to the liquid crystal light modulator 1211. A mirror 1214 reflects an incoming light to the liquid crystal light modulator 1211. A detector 1215 (DET) is the photodetector (PD) to monitor the light reflected by the mirror 1214 and then reflected by the liquid crystal light modulator 1211.

Figure 12B:
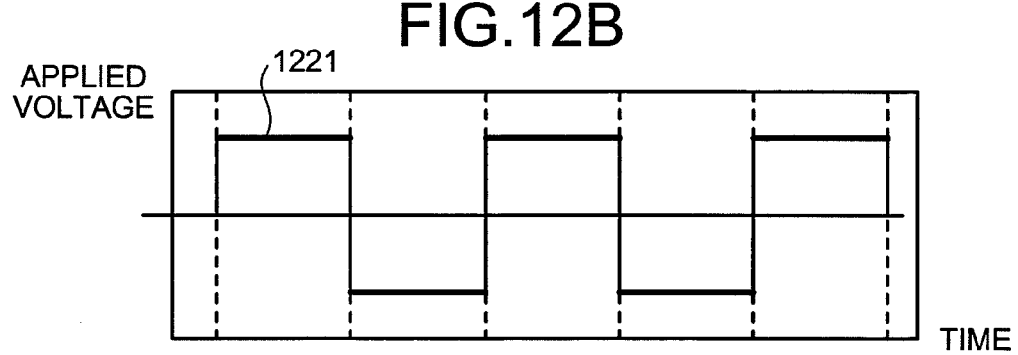
FIG. 12B is a diagram of the drive voltage applied to the liquid crystal light modulator shown in FIG. 12A.

FIG. 12B is a diagram of the drive voltage applied to the liquid crystal light modulator shown in FIG. 12A. In FIG. 12B, the horizontal axis represents time and the vertical axis represents the voltage applied to the liquid crystal light modulator 1211. In FIG. 12B, a case is described in which a rectangular AC voltage 1221 with a duty ratio of 0.5 is applied to the liquid crystal light modulator 1211 by a power source 1212.

Figure 12C:
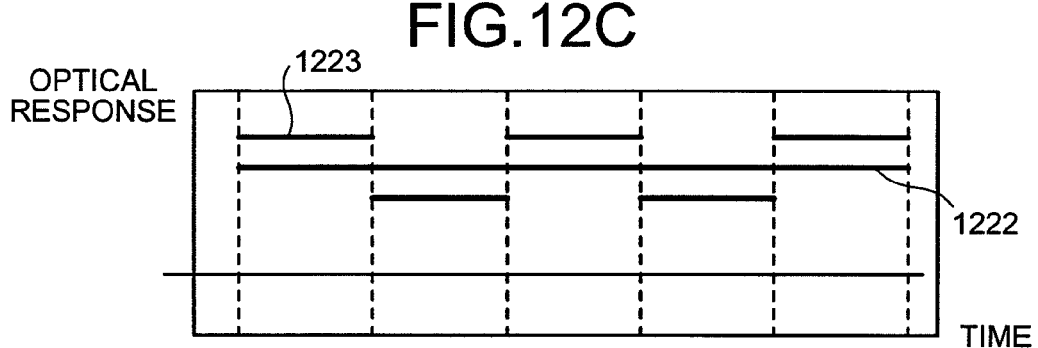
FIG. 12C is a diagram of optical response monitored by a detector shown in FIG. 12A.

FIG. 12C is a diagram of optical response monitored by the detector shown in FIG. 12A. In FIG. 12C, the horizontal axis represents time and the vertical axis represents the optical response of the liquid crystal light modulator 1211. The optical response monitored by the detector 1215 is ideally equivalent to that of the experimental device shown in FIG. 12A from which the external DC power source 1213 is removed, and is constant as indicated by the optical response 1222 shown in FIG. 12C. This is because the liquid crystal light modulator 1211 is a nematic liquid crystal cell and responds to the effective value, and thus its optical response is intrinsically constant to the alternating electric field.

In actual measurement, however, the optical response monitored by the detector 1215 in the low frequency drive (several Hz to dozens Hz) is such as shown by the optical response 1223 of FIG. 12C, and a generation of the flicker corresponding to the rectangular AC voltage 1221 is likely to be observed. It should be noted that this is not a flicker reflecting the waveform response of the applied pulse waveform, but a flicker observed corresponding to the reversal of the polarity of the low frequency drive waveform. This can be attributed to the asymmetry of element structure forming the liquid crystal light modulator 1211 or the bias of the space charge generated by mobile ionization of a part of impurity ion inside the liquid crystal.

The situation in which such a flicker is generated is equivalent to a case in which the DC voltage is applied inside the liquid crystal layer and therefore, becomes a factor of affecting long-period reliability and of causing deterioration of device characteristics. Vcom (common voltage) shift is evaluated by applying a DC voltage (bias voltage) by the external DC power source 1213 so that no flicker is observed from the outside and defining the DC voltage at that time as Vcom (DC offset). Despite the application of the DC voltage from the outside, the shift amount of the Vcom shift is dependent on time and is likely to change in the positive or negative direction in accordance with time. Generally, a lower Vcom shift amount is considered to be effective for improved reliability.

Figure 13:
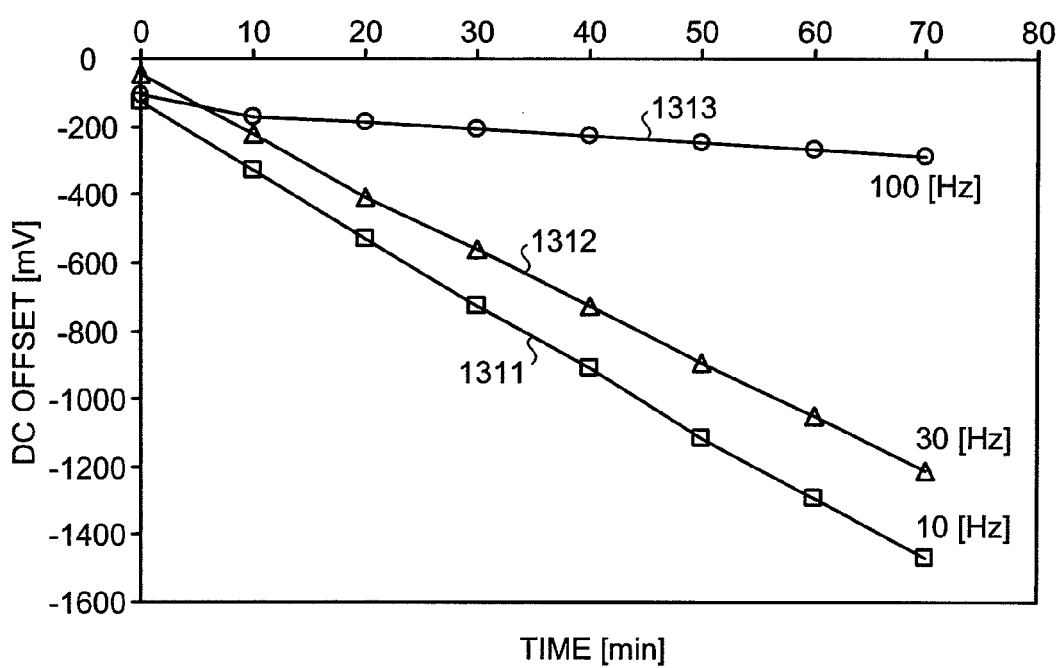
FIG. 13 is a graph of a change in the DC offset according to time.

FIG. 13 is a graph of a change in the DC offset according to time. In FIG. 13, the horizontal axis represents time [min] and the vertical axis represents the DC offset [mV]. Characteristics 1311 through 1313 indicate the change in the DC offset when the frequency of the drive signal is 10 [Hz], 30 [Hz], and 100 [Hz], respectively. The results shown in shown in FIG. 13 indicate that the Vcom shift amount can be reduced by increasing the frequency of the drive signal.

Figure 14:
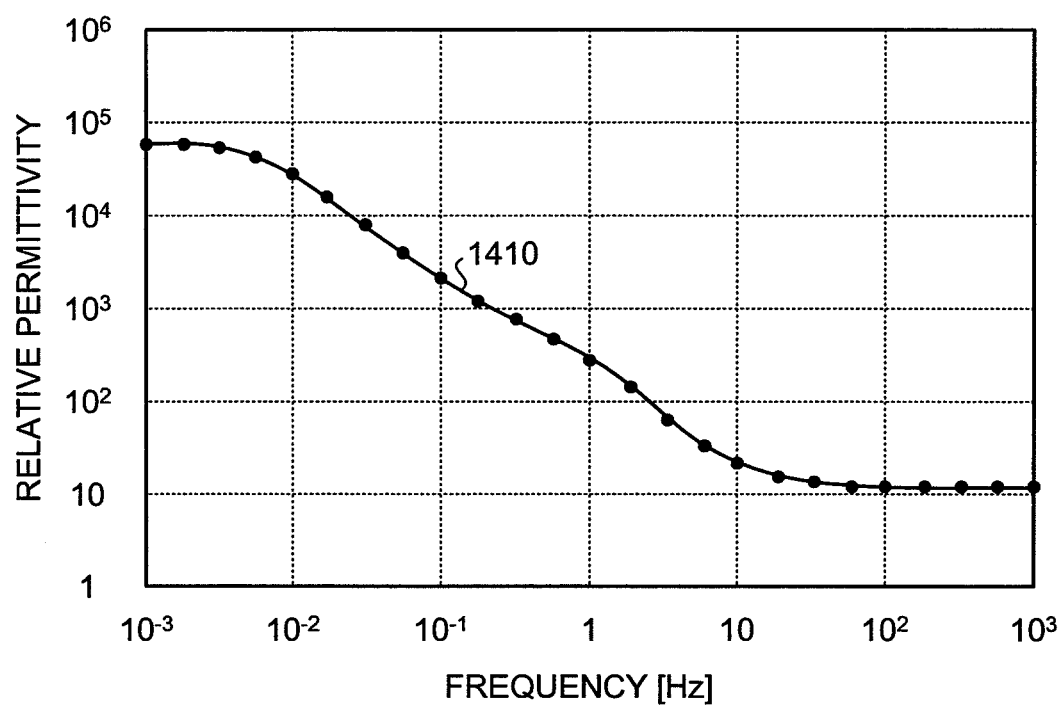
FIG. 14 is a graph of an example of dielectric characteristics of liquid crystal material 5CB.
Figure 15:
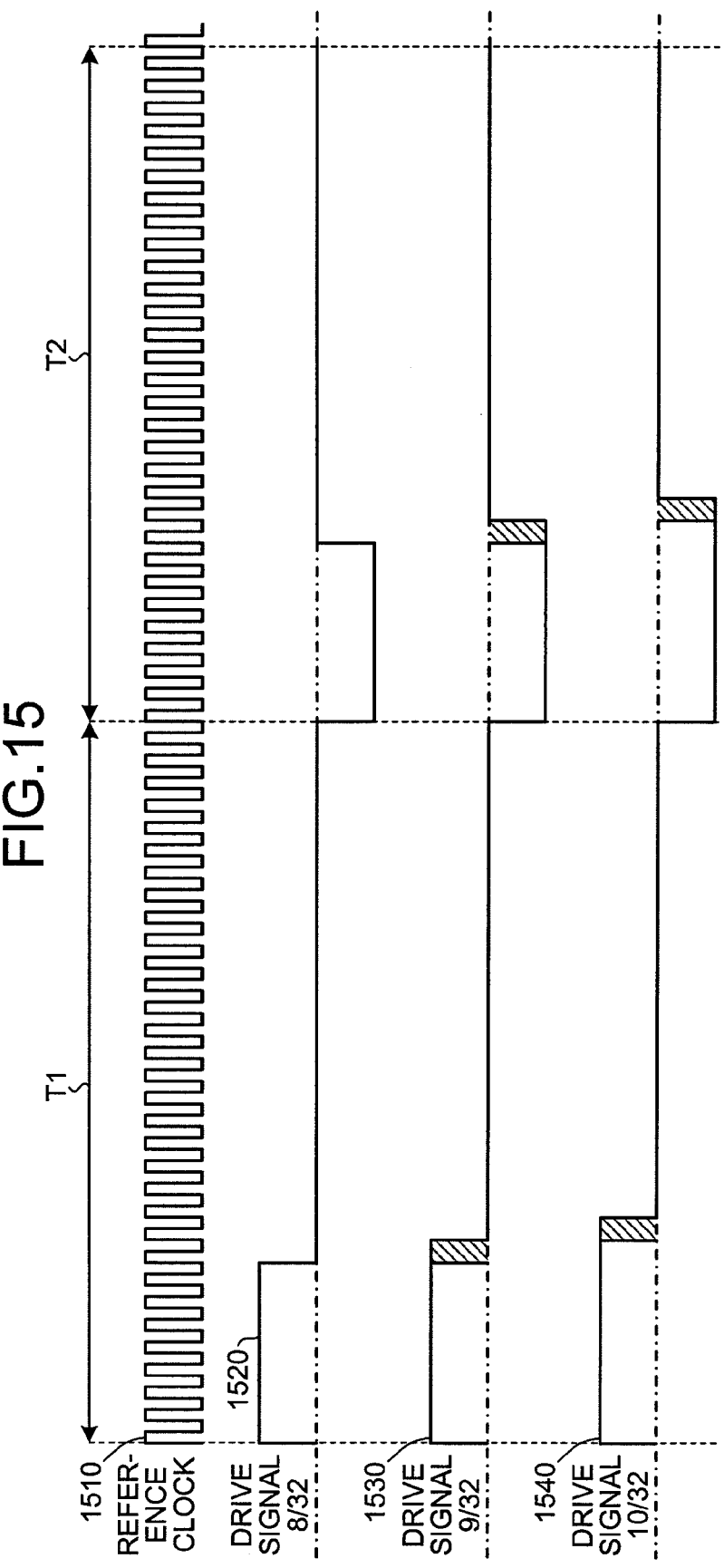
FIG. 15 is a diagram of an example of a drive signal supplied to the liquid crystal light modulator by a conventional driving apparatus.

FIG. 14 is a graph of an example of dielectric characteristics of liquid crystal material 5CB. In FIG. 14, the horizontal axis represents the frequency [Hz] of the drive signal supplied to the liquid crystal light modulator 1211 and the vertical axis represents relative permittivity (substantial part of complex permittivity). As shown in FIG. 14, a dielectric relaxation curve 1410 becomes constant when the frequency of the drive signal supplied to the liquid crystal light modulator 1211 is set at 100 [Hz] or more.

While the dielectric relaxation curve varies depending on various kinds of ions contained in the liquid crystal layer, manufacturing environment of the liquid crystal cell, and parameters such as the type and the temperature of the liquid crystal used, it is clear that the plateau observed at the frequency higher than 100 [Hz] in FIG. 14 depends on the mobility of the movable ion in the liquid crystal layer. It has been also confirmed from the results of the DC offset evaluation shown in FIG. 13 that the Vcom shift becomes small by increasing the frequency of the drive signal (for example, 100 [Hz]).

Thus, one of major factors of the shift of characteristic of the liquid crystal device related to the Vcom shift is considered to be the dielectric relaxation due to the impurity ion inside the liquid crystal layer of the liquid crystal light modulator 1211. The shift of characteristic due to the movable ion can be reduced by setting the lowest frequency component when the number of pulses contained in the drive waveform, namely, in each frame has reached the predetermined number at 100 [Hz] or more in consideration of the dielectric relaxation.

Therefore, while it is important to reduce the impurity ion in actual liquid crystal device, it is expected that the reliability, the shift of characteristic, and the chronological change thereof can be further improved by setting the lowest frequency component contained in the drive frequency at 100 [Hz] or more. While the actual liquid crystal light modulator includes plural materials suitable for device characteristics blended together, the effect of the impurity ion is considered to be the same as in the example of the liquid crystal material 5CB described above.

As described above, the driving apparatus 21 enables a high-frequency drive of the liquid crystal light modulator 11 by supplying the drive signal containing plural pulses in each frame. The pulse waveform response can be suppressed by decreasing the interval between two consecutive pulses in achieving the predetermined effective value for each frame. Since the frequency of the reference clock is not required to be high, lower power consumption and noise level reduction can be achieved.

The lowest frequency contained in the drive frequency can be increased by setting the drive cycle obtained by adding the former frame and the latter frame with reversed polarities and including the drive signal containing plural pulses at 10 [ms] or less (by setting the lowest frequency contained in the drive signal defined by the inverse number of the frame polarity alternating cycle at 100 [Hz] or more), without increasing the clock frequency required for the multi-leveling more than necessary. This makes it possible to suppress the movement of the movable ion in the liquid crystal layer of the liquid crystal light modulator 11 and improve the reliability.

INDUSTRIAL APPLICABILITY

As described above, the driving apparatus and the light modulating apparatus according to the present invention are useful for a driving apparatus and a the light modulating apparatus for optical modulation and in particular, are suitable for an optical modulator and a light modulating apparatus used for optical communication.

What is claimed is:

1. A driving apparatus that supplies a drive signal to a pixel portion of a liquid crystal light modulator, the drive signal including a plurality of frames each of which is a period during which an effective voltage based on modulation data is applied to the pixel portion of the liquid crystal light modulator, the driving apparatus comprising:

a generating unit that generates, for each frame, the drive signal, said drive signal containing a plurality of pulses at said effective voltage, said generating unit:
(a) in a first mode, increasing the number of pulses contained in each frame in accordance with an increase of the modulation data when the number is less than a predetermined number, and
(b) in a second mode, increasing the width of a pulse contained in each frame, on an individual basis, in accordance with the increase of the modulation data when the number has reached the predetermined number; and a supplying unit that supplies the drive signal generated by the generating unit to the liquid crystal light modulator.

2. The driving apparatus according to claim 1, wherein the drive signal is generated such that an alternation of polarity is completed within two consecutive frames.

3. The driving apparatus according to claim 1, wherein each frame corresponds to a section that includes a plurality of pulses, the number of which corresponds to the number of levels of the modulation data, of a reference clock for generating the drive signal.

4. The driving apparatus according to claim 1, wherein the longest period during which no pulse is applied within the frame except when an applied voltage is 0 V is set at $1\times10^{-4}$ [sec] or less.

5. The driving apparatus according to claim 1, wherein the longest period during which no pulse is applied within the frame except when an applied voltage is 0 V is set at $5\times10^{-5}$ [sec] or less.

6. The driving apparatus according to claim 1, wherein the lowest frequency contained in the drive signal defined by inverse number of a frame polarity alternating cycle when the number of pulses contained in each frame has reached the predetermined number is set at 100 Hz or more.

7. A variable optical attenuator comprising the driving apparatus for the liquid crystal light modulator according to claim 1.

8. The driving apparatus according to claim 1, wherein the drive signal is operative to control flicker of the liquid crystal light modulator.

* * * * *